(12) United States Patent
Lo et al.

(10) Patent No.: US 7,688,723 B1
(45) Date of Patent: Mar. 30, 2010

(54) PROCEDURAL XML-BASED TELEPHONY TRAFFIC FLOW ANALYSIS AND CONFIGURATION TOOL

(75) Inventors: Wing Fai Lo, Plano, TX (US); Richard Charles McNamara, Boulder, CO (US); Bruce W. Robinson, Longmont, CO (US)

(73) Assignee: Avaya Inc., Basking Ridge, NJ (US)

(*) Notice: Subject to any disclaimer, the term of this patent is extended or adjusted under 35 U.S.C. 154(b) by 1172 days.

(21) Appl. No.: 10/944,069

(22) Filed: Sep. 16, 2004

(51) Int. Cl.
H04L 12/26 (2006.01)

(52) U.S. Cl. ............. 370/230; 370/252; 370/468

(58) Field of Classification Search .......... 370/252, 370/468
See application file for complete search history.

(56) References Cited

U.S. PATENT DOCUMENTS

| | | | |
|---|---|---|---|
| 4,009,343 A | 2/1977 | Markey et al. | |
| 5,948,069 A * | 9/1999 | Kitai et al. | 709/240 |
| 6,075,848 A * | 6/2000 | Lunn et al. | 379/112.01 |
| 6,169,748 B1 * | 1/2001 | Barbas et al. | 370/468 |
| 6,404,769 B1 * | 6/2002 | Kapoor | 370/398 |
| 6,754,843 B1 * | 6/2004 | Lu et al. | 714/4 |
| 6,775,824 B1 | 8/2004 | Osborne et al. | |
| 6,807,156 B1 | 10/2004 | Veres et al. | |
| 6,826,716 B2 | 11/2004 | Mason | |
| 6,885,641 B1 | 4/2005 | Chan et al. | |
| 6,895,578 B1 | 5/2005 | Kolawa et al. | |
| 6,901,051 B1 | 5/2005 | Hou et al. | |
| 6,934,934 B1 | 8/2005 | Osborne et al. | |
| 6,944,848 B2 | 9/2005 | Hartman et al. | |
| 6,948,153 B2 | 9/2005 | Bowers | |
| 6,965,575 B2 | 11/2005 | Srikrishna et al. | |
| 6,966,048 B2 | 11/2005 | Bowers | |
| 6,968,363 B1 | 11/2005 | Mulvey | |
| 6,968,371 B1 * | 11/2005 | Srinivasan | 709/223 |
| 7,000,224 B1 | 2/2006 | Osborne et al. | |
| 7,054,308 B1 * | 5/2006 | Conway | 370/356 |
| 7,095,732 B1 * | 8/2006 | Watson, Jr. | 370/346 |
| 7,124,401 B2 | 10/2006 | Muller et al. | |
| 7,127,641 B1 | 10/2006 | Anderson | |
| 7,149,226 B2 | 12/2006 | Wolrich et al. | |
| 7,149,917 B2 | 12/2006 | Huang et al. | |

(Continued)

OTHER PUBLICATIONS

Optimizing call admission control with QoS guarantee in a voice/data integrated cellular network using simulated annealing; Tat-Chung Chau; Wong, K.Y.M.; Bo Li; Global Telecommunications Conference, 2002. GLOBECOM '02. IEEE.*

(Continued)

Primary Examiner—Salman Ahmed
(74) Attorney, Agent, or Firm—Sheridan Ross P.C.

(57) ABSTRACT

A system for analyzing at least a portion of a telecommunications network is provided. The system includes a traffic flow analyzer 124 operable to (a) assign a plurality of network components to at least first, second, and third component sets 1216, 1220 and 1224, respectively, wherein the first and second component sets correspond to voice communication endpoints; (b) determine bulk voice traffic flows at least one of generated and received by the first and second component sets and passing through the third component set; and (c) based on the bulk voice traffic flow passing through the third component set, determine a requirement for the third component set to realize a selected grade and/or quality of service.

26 Claims, 15 Drawing Sheets

U.S. PATENT DOCUMENTS

| | | | |
|---|---|---|---|
| 7,181,743 B2 * | 2/2007 | Werme et al. | 718/104 |
| 7,185,103 B1 | 2/2007 | Jain | |
| 7,213,179 B2 | 5/2007 | Song et al | |
| 7,239,166 B2 | 7/2007 | Braverman et al. | |
| 7,245,922 B2 * | 7/2007 | Furuskar et al. | 455/453 |
| 7,328,428 B2 | 2/2008 | Baugher | |
| 7,352,706 B2 | 4/2008 | Klotz et al. | |
| 7,523,355 B2 | 4/2009 | Huang et al. | |
| 7,564,793 B2 * | 7/2009 | Baldwin et al. | 370/237 |
| 7,613,474 B2 * | 11/2009 | Lee | 455/522 |
| 2003/0235280 A1 * | 12/2003 | Shafie-Khorasani et al. | 379/112.01 |
| 2004/0002864 A1 * | 1/2004 | Yeom | 704/270.1 |
| 2004/0081079 A1 | 4/2004 | Forest et al. | |
| 2004/0160983 A1 * | 8/2004 | Kuskin et al. | 370/471 |
| 2004/0240385 A1 * | 12/2004 | Boggs et al. | 370/230 |
| 2005/0018611 A1 | 1/2005 | Chan et al. | |
| 2006/0146820 A1 * | 7/2006 | Friedman et al. | 370/390 |
| 2007/0286374 A1 * | 12/2007 | Romeo | 379/142.07 |

OTHER PUBLICATIONS

IP over wireless mobile ATM-guaranteed wireless QoS by HiperLAN/2; Welke, B.H.; Esseling, N.; Habetha, J.; Hettich, A.; Kadelka, A.; Mangold, S.; Peetz, J.; Vornefeld, U.; Proceedings of the IEEE; vol. 89, Issue 1, Jan. 2001 pp. 21-40.*

Comparing IPv4 end-to-end QoS capabilities with QoS techniques using RSVP and MPLS; Fgeel, E.-B.; Phillips, W.J.; Sivakumar, S.; Robertson, W.; Electrical and Computer Engineering, 2002. IEEE CCECE 2002. Canadian Conference on vol. 3, May 12-15, 2002 pp. 1455-1460 vol. 3.*

Behaviour investigation using simulation for redundant multicast transmission supporting adaptive QoS; Bouras, C.; Gkamas, A.; Karaliotas, A.; Stamos, K.; Networks, 2002. ICON 2002. 10th IEEE International Conference on Aug. 27-30, 2002 pp. 112-117.*

A simulation study on traffic aggregation in multi-service networks; Dolzer, K.; Payer, W.; Eberspacher, M.; High Performance Switching and Routing, 2000. ATM 2000. Proceedings of the IEEE Conference on Jun. 26-29, 2000 pp. 157-165.*

Gregory V. Wilson, "XML-Based Programming Systems," Doctor Dobb's Journal, pp. 16-24, Mar. 2003.

"Welcome to Superx++ Source!," available at http://xolusplus.sourceforge.net/indexPage.html (Nov. 4, 2002).

"Download XppEngCOM.dll," available at http://xplusplus.sourceforge.net/Downloads/XppEngCOM.html (2002).

"Download XppEngFilt.dll," available at http://xplusplus.sourceforge.net/Downloads/XppEngFilt.html (2002).

"Download XppConsole.exe," available at http://xplusplus.sourceforge.net/Downloads/XppConsole.html (2002).

"Download XppHub.exe," available at http://xplusplus.sourceforge.net/Downloads/XppHub.html (2002).

"Download XppExt.dll," available at http://xplusplus.sourceforge.net/Downloads/XppExt.html (2002).

"Download XppTester.exe," available at http://xplusplus.sourceforge.net/Downloads/XppTester.html (2002).

White Paper entitled, "IP Telephony : The Five Nines Story," Cisco Systems, Inc. (Aug. 26, 2002), available at http://www.cisco.com/warp/public/cc/so/neso/vvda/iptl/5nine_wp.pdf.

Gary Audin, "Reality Check on Five-Nines," Business Communications Review (May 2002), available at http://www.bcr.com/bcrmag/2002/05/p22.php, pp. 22-27.

"LSSGR: Reliability, Section 12, A Module of LSSGR, FR-64," Telcordia Technologies, GR-512-CORE, Issue 2 (Jan. 1998).

Freeman, Roger L., "Chapter 1: Some Basics In Conventional Telephony," *Telecommunication System Engineering*, pp. 1-57.

U.S. Appl. No. 10/671,279, filed Sep. 24, 2003, Callahan et al.

* cited by examiner

|  |  | Called (Receiving) Parties | | | | | |
|---|---|---|---|---|---|---|---|
|  |  | Network Region 1 | | | Network Region 1 | | |
|  |  | IP | DCP | PSTN | IP | DCP | PSTN |
| NR 1 | IP | 33.3 | 40 | 140 | 46.7 | 20 | 0 |
| NR 1 | DCP | 40 | 48 | 168 | 56 | 24 | 0 |
| NR 1 | PSTN | 140 | 168 | 0 | 0 | 0 | 0 |
| NR 2 | IP | 46.7 | 56 | 0 | 65.3 | 28 | 196 |
| NR 2 | DCP | 20 | 24 | 0 | 28 | 12 | 84 |
| NR 2 | PSTN | 0 | 0 | 0 | 196 | 84 | 0 |

Called (Dialing) Parties

*Fig. 14*

PROCEDURAL XML-BASED TELEPHONY TRAFFIC FLOW ANALYSIS AND CONFIGURATION TOOL

CROSS REFERENCE TO RELATED APPLICATIONS

The present application contains subject matter related to that in U.S. patent application Ser. No. 10/671,279 entitled "MASS TEST GENERATOR", filed Sep. 24, 2003, which is incorporated herein by this reference.

FIELD OF THE INVENTION

The present invention is directed generally to telecommunication systems and specifically to performance modeling and design of telecommunication systems.

BACKGROUND OF THE INVENTION

Telecommunication engineers frequently model telecommunication networks for a variety of purposes. For example, such modeling information can be used to design, properly and effectively, new networks and identify traffic flow problems in existing networks. The networks can then be reconfigured to remove the problems, thereby enhancing dramatically both network performance and the quality of subscriber service. When a customer orders an enterprise system, it is necessary to provide recommendations for the required desired quantities of the various components and resources to be used. Many such components are traffic-sensitive and must be sized based upon anticipated call traffic levels.

Much of the modeling theories and algorithms have been developed for circuit-switched networks. Normally, the usage of a circuit-switched transmission route or switch can be defined by two parameters, namely the calling rate, or the number of times a route or traffic path, is used per unit period (or more properly defined the call intensity per traffic path during the busy hour) and the holding time, or the duration of occupancy of a traffic path by a call (or sometimes the average duration of occupancy of one or more paths by calls). The "busy hour" refers to the carried and/or offered traffic on a traffic path during the busiest continuous one-hour period of a typical day. Carried traffic is the volume of traffic actually carried by a traffic path, and offered traffic is the volume of traffic offered to the traffic path. A traffic path is a channel, time slot, frequency band, line, trunk, link, switch, server, network, circuit, or other network component over which individual communications pass concurrently or in sequence. Traffic density refers to the number of simultaneous calls at a given moment while traffic intensity represents the average traffic density during a one-hour period (and is denoted by the unit Erlang). The grade of service, denoted by p, expresses the probability of meeting call blockage during the busy hour.

When dimensioning a traffic path, several mathematical formulas have been used. The Erlang B loss formula (which is typically based on lost calls cleared) is given by the following mathematical relationship:

$$E_B = \frac{A^n/n!}{1+A+A^2/2!+\ldots+A^n/n!}$$

where $E_B$ is the grade of service (i.e., the probability of finding all channels busy) n is the number of trunks or servicing channels, and A is the mean of the offered traffic. The formula assumes that traffic originates from an infinite number of sources, there is equal traffic density per source, lost calls are cleared assuming a zero holding time, the number of trunks or servicing channels are limited, and full availability exists. In the United States, the Poisson or Molina formula is preferred and is given by the following mathematical relationship:

$$P = e^{-A} \sum_{x=n}^{\infty} \frac{A^x}{x!}$$

where P is the probability that calls will be lost (or delayed) because of insufficient channels, A is the expected traffic density, expressed in busy hour Erlangs, n is the number of channels in the group of channels, and x is a variable representing a number of busy sources or busy channels. The Poisson formula assumes that traffic originates from a large (infinite) number of independent subscribers or sources (random traffic input) with a limited number of trunks or servicing channels, there is equal traffic density per source, and lost calls are held. Other mathematical formulas in use include the Erlang C formula (which assumes infinite sources, lost calls delayed, exponential holding times, and calls serviced in order of arrival) and the binomial formula (which assumes finite sources, equal traffic density per source, and holding of lost calls).

Network design in general and resource provisioning in particular is becoming increasingly more difficult. The complexity results from the multiplicity of communication modalities, such as circuit-switched voice, packet-switched voice or VoIP, instant messaging, and chat sessions, the differing types of traffic (voice and nonvoice) being handled simultaneously by a packet-switched network and the difficulty in predicting with accuracy the volume and nature of the traffic, the concurrent usage of both circuit-switched and packet-switched networks, the use of encrypted and unencrypted data streams, and the variety and number of software and hardware components required to operate the networks.

Design based on mathematical calculations, such as those noted above, is overwhelming due to the inability to cope with complex network topologies, intricate inter-population calling patterns, and the various influences of compression and resource usages imposed by inter- and intra-site codecs (or coders/decoders). Current mathematical models are capable of dealing with only a few sites, only the most generic calling patterns, and only a grossly simplified application of codecs. Real world examples, however, can include hundreds of sites with unlimited combinations of populations, calling patterns and codecs. These real-world examples are completely beyond the capabilities of any purely mathematical analysis.

Due to the limitations of mathematical approaches, stochastic or event-driven modeling or simulation techniques have been developed to assist in network design. In such techniques, the network is characterized functionally in software and calls having predefined durations are generated at selected intervals. The call interarrival and holding times follow a defined type of probability distribution, such as an exponential distribution. The generated calls are inputted into the logical characterization of the network. The individual call flows through the various nodes of the simulated network can be observed and analyzed. This approach can not only be computationally demanding but also difficult to implement. More complex networks can require hundreds of man hours to logically characterize. Such man-hour expenditures are economically prohibitive in many applications, such as resource provisioning.

SUMMARY OF THE INVENTION

These and other needs are addressed by the various embodiments and configurations of the present invention. The present invention is directed generally to the use of bulk traffic flows between/among network components to evaluate quality parameters and one or more network requirements. As used herein "bulk" traffic flow refers to traffic flow that includes a plurality of discrete communications between sets, groups or communities of endpoints. Bulk traffic flow includes total or mass flow, average flow, median flow, and the like over a selected time period, such as the busy hour, peak busy hour, time consistent busy hour, engineering period and average busy season busy hour. The traffic flow can be any type of traffic, whether media- or signaling-type traffic including, without limitation, voice, video, instant messaging, and application sharing.

In a first embodiment, a method for analyzing a selected portion of a telecommunications network is provided. The method includes the steps of:

(a) assigning a number of network components to at least first, second, and third component sets or communities (the first and second component sets corresponding to communication endpoints);

(b) determining bulk traffic flows generated and/or received by the first and second component sets and passing through the third component set; and (c) based on the bulk traffic flow passing through the third component set, determining a requirement (e.g., capacity, quantity, and configuration) for the third component set to realize a selected grade and/or quality of service.

The communication endpoints typically generate/receive voice, particularly live voice, communications. Examples of communication endpoints include packet-switched voice communication devices and/or circuit-switched voice communication devices, and of network components in the third component set including switches, routers, digital signal processors, gateway resources, time division multiplexed slots, time division multiplex buses, trunks, ports, codecs, and/or port networks.

The bulk traffic flows are preferably determined based on a logical characterization of the selected portion of the telecommunications network. As will be appreciated, the logical characterization defines the relationships among the first, second, and third component sets. In a particular preferred configuration, the logical characterization is a wire model expressed in a markup language. A wire is a connection between two components. Components connected by a wire may allow traffic to flow between them. The use of a markup language can provide a cost efficient and flexible tool that allows for simulating network instance topologies and traffic flow, allowing for large and varying volumes of traffic flow in complex network topologies. It can significantly increase the precision and usefulness of the traffic analysis techniques.

The bulk traffic flows are commonly expressed in a community of interest matrix. The matrix is typically two dimensional and indexes the traffic between sets of calling endpoints and called endpoints. The endpoint sets can be further grouped by physical and/or network location.

The direction and amount of the bulk traffic flows are based on defined rules, such as routing and/or switching rules, type or class of communication devices, identity and/or business role of the device and/or the party associated with the device, physical location, and network location. Commonly, the direction and amount of flows are based on the Uniform Distribution Model.

Where the voice communications include compressed or encrypted traffic flows, the encrypted traffic flows are sometimes converted to corresponding unencrypted bulk traffic flows using a suitable conversion factor. Whether the conversion is made depends on the type or network level of the components in the third component set. If the components operate below the codec level, the conversion is made. If the components operate at or above the codec level, the conversion is not made.

The requirement(s) can be determined by simulation and/or mathematical equations. In one configuration, both simulation and mathematical techniques are employed. A mathematical calculation client of the traffic flow analyzer is used to specify what fraction of the traffic generated by each endpoint community is terminated by each of the other communities and to specify the varying impact of codec compression on components and resource usage. The traffic value between each pair of communities is propagated through the relevant components in a network topology simulation traffic flow analyzer component, and the traffic volume summaries recorded at each of the components. When the process has been completed, the traffic usage at each component (the simple total of recorded traffic that had been passed through it) is returned to the calculation client where a mathematical model is used to translate each component's traffic level into the component quantity required to support a specified or selected grade of service.

The present invention is considerably different from conventional techniques for telephony traffic engineering. As will be appreciated, traffic engineers have been applying bulk traffic flow analysis, in a generic sense, to circuit-switched telephony network for decades. The communities in the community of interest matrix were based on the geographic or logical locations of circuit-switched communication endpoints. Traditional analysis requires the traffic engineer to study how the traffic flows between endpoints and derives an expression for the traffic flowing through the intermediate components. When Voice over IP is mixed with traditional circuit-switched telephony, the traffic flows become significantly more complicated. It is therefore difficult to derive a generic expression to characterize the traffic flowing through the intermediate components in both circuit-switched and packet-switched networks. The present invention addresses this need by forming communities or sets of communication devices that handle the same type of traffic. For example, a first community or set of devices handles circuit-switched telecommunications and a second different community or set of devices handles packet-switched telecommunications. A special expression for each of the components in third community or third set of devices is formulated for the specific network under design. This is effected by exhaustively analyzing traffic flows between all possible source/destination pairs between the first and second communities. This analysis also covers multiple outcomes of how a call may route (through multiple probable paths) or terminate (going to voice mail, rather than being answered). This approach enables the analysis of an arbitrarily complex network, with the limitation being the computer resources that the analysis is running on, and not the tractability of the general expressions the traffic engineer has to deal with.

The present invention can provide a number of other advantages relative to the prior art. For example, the use of sets or communities of endpoints and bulk traffic flow rather than individual calls can greatly simplify the network simulation due to the ability to model the network at a higher, less granular, simpler level, and can provide a high throughput performance. The combination of mathematical modeling with simulation to determine quality parameters (such as grade of service, availability, reliability, server occupancy, and the like) in a network instance design and to make provisioning suggestions sufficient to bring these quality parameters to desired levels can combine the strengths of both approaches while minimizing their weaknesses. The combination can be computationally efficient and provide a high speed of calculation. By using a markup language to model the network (e.g., to generate traffic between/among all possible endpoint communities and add up the results), traffic usages at the various components in very complex systems can be ascertained, without relying on prohibitively difficult mathematical formulas. Because the simulation commonly has no stochastic element (only the bulk flow rates are generated as opposed to simulating individual calls), the execution speed can be considerably faster than standard stochastic simulations. Moreover, some mathematical formulas have been derived to provide a way to avoid time-consuming iterative processes. The overall result is a tool that can handle much more complex systems than existing tools, without a significant increase in execution time.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 14 is a community of interest matrix according to a second configuration.

DETAILED DESCRIPTION

The Resource Provisioning System

Figure 1:
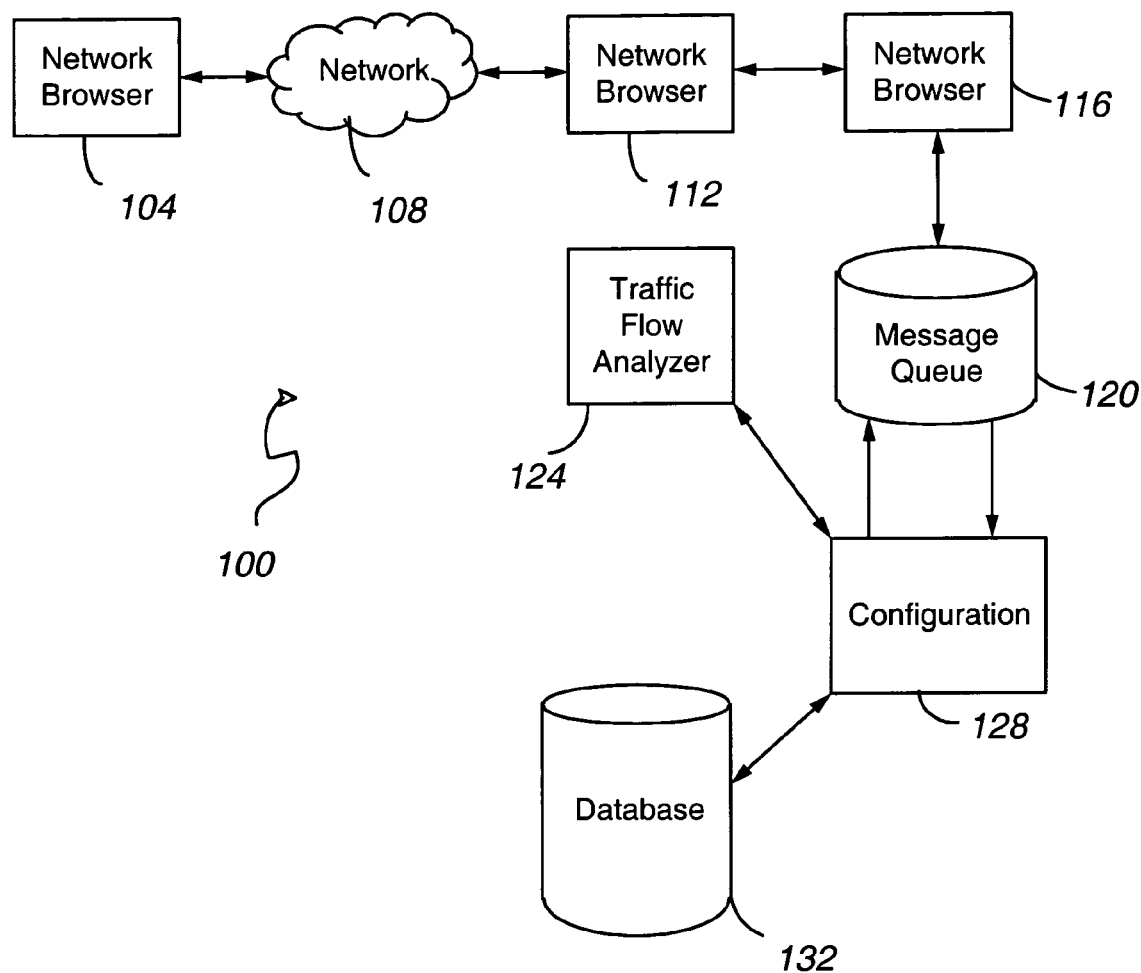
FIG. 1 is a block diagram of a resource provisioning system according to an embodiment of the present invention.

FIG. 1 depicts the resource provisioning system 100 according to a first embodiment of the present invention. The system 100 comprises a network browser 104 or other graphical rendering engine, a data network 108, a network server 112, a queue manager 116, a message queue 120, a traffic flow analyzer 124, a configurator 128, and a database 132. The network browser 104 sends requests from a user to the network server 112, receives responses from the network server 112, and causes display of the responses to the user. The network server 112 likewise receives requests from the network browser 104, provides the requests to the queue manager 116, and receives and sends responses from the queue manager 116 to the network browser 104. The configurator 128 forwards a request to the traffic flow analyzer 124 for resource provisioning information. The analyzer 124 runs the appropriate network model, determines the quality parameters and specifications for the requested network components, and returns the specifications to the configurator 128.

The network browser and server 104 and 112 can be any suitable device, such as conventional Web browsers and servers. For example when Web-based, the browser may be implemented based on Microsoft Internet Explorer or Netscape and the server based on UNIX.

The queue manager 116 can be any suitable computational component for controlling the message queue 120. In a preferred configuration, the queue manager is configured as a persistent message manager.

The database 132 includes an application processing interface (not shown) with the configurator 128 and traffic flow analyzer 124 and contains various records, including network topology definitions (typically written in a markup language such as XML) for the traffic analyzer 124 and one or more forms, materials, macros, prototypes, and a control program for the configurator.

The configurator 128 can be any suitable configurator, with an XML-based configurator being preferred. In one configuration, the machine code used to run the configurator is written in a markup language along with the input into and the output from the configurator. Generally, the markup language for the configurator code and input and output data objects is the same markup language with XML being preferred. In one configuration, the configurator uses information contained in the database 132, such as forms, materials, macros, and prototypes documents, and operates using a control program written in markup language.

The traffic flow analyzer 124 uses a combination of mathematical equations and simulation to estimate/predict bulk traffic flows at selected points in the telecommunications network, determines the quality parameters and resource requirements at each point, and provides the resource requirements to the configurator 128 to use in providing output, such as a bill of material, to the customer. The simulation component of the analyzer is not event-driven or operated on a call-by-call basis. It operates on an endpoint pair basis. The simulation component groups network components together as communities and evaluates bulk or mass traffic flow between/among communities. In other words, the bulk traffic flow is accumulated at each selected network node/component. The mathematical component uses the accumulated bulk or mass traffic flows and mathematical equations to compute system resource requirements at each node/component.

Finally, the network 108 can be any packet-switched, distributed processing network, such as the Internet. In a preferred configuration, the network 108 is configured according to the TCP/IP suite of protocols.

In one configuration, at least some of the machine code used to control operation of the queue manager, traffic flow analyzer, and configurator are written in a common markup language, such as XML. The messages exchanged between the components are also in the common markup language. This configuration supplies an environment, method and tools for simulating network instance topologies, large and complex call volumes and codecs, and for the flow and accumulation of media and signaling traffic volumes within the network component nodes. The accumulated traffic volumes are then supplied to the mathematical calculation component in the traffic flow analyzer where quality and provisioning calculations are performed.

In one configuration, messages from the network server 112 and the traffic flow analyzer 124 provide a display to the user (of the network server) in the form of a drag-and-drop interface. This would require minor extensions to XML to add iconic graphics and an application, such as Visio™ to manage the graphics. As will be appreciated, XML already supports either a bottom-up or top-down system definition.

The Operation of the Traffic Flow Analyzer

Figure 2:
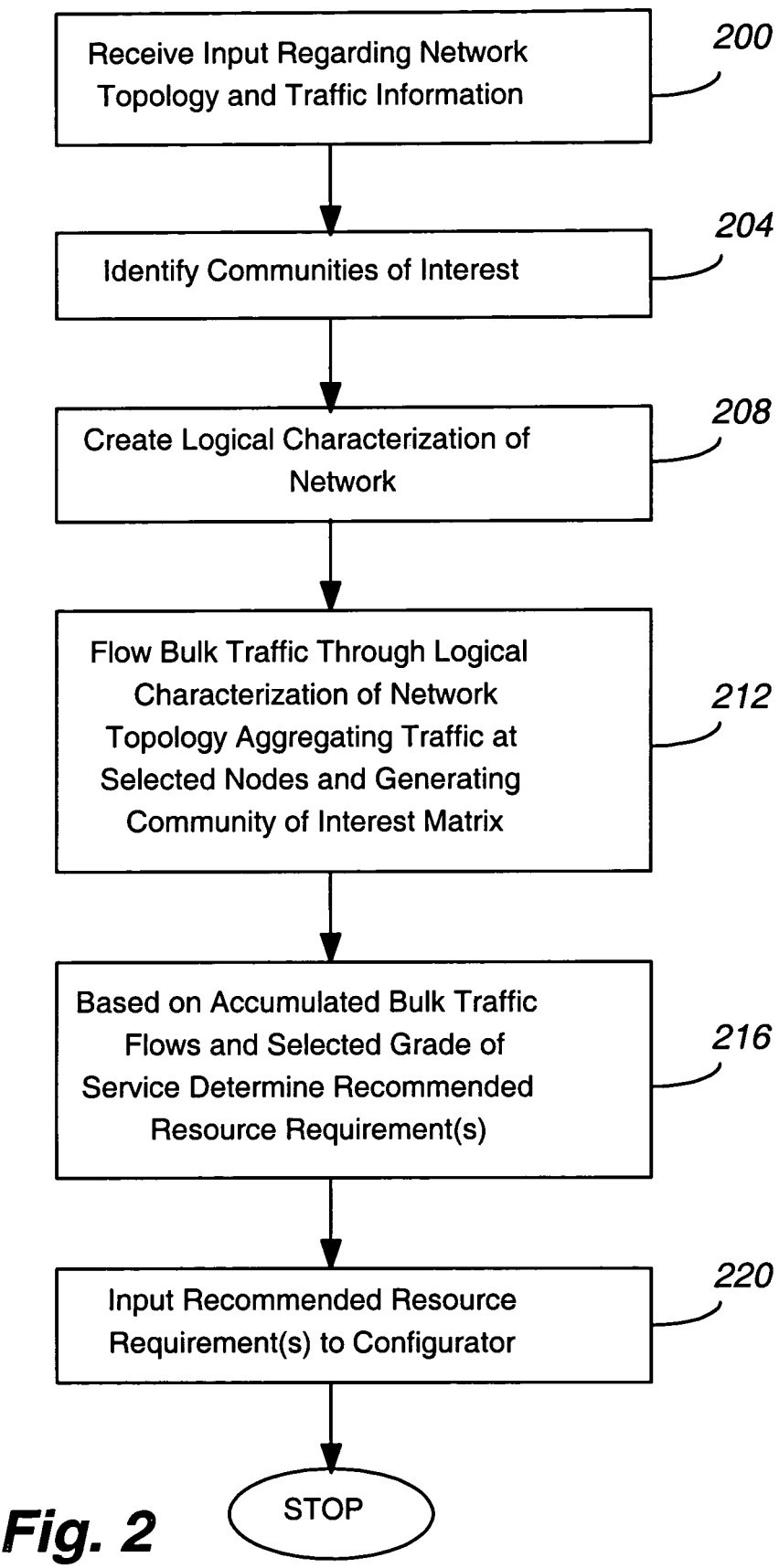
FIG. 2 is a flowchart depicting operation of the traffic flow analyzer according to an embodiment of the present invention.

Before discussing the operation of the resource provisioning system in its entirety, the operation of the traffic flow analyzer 124 will be discussed with reference to FIG. 2.

In step 200, fundamental network configuration and traffic information is obtained, such as from the customer. Such information can include the number and physical/network locations of enterprise network regions or sites, the network components (e.g., the number of packet-switched telephones, circuit-switched telephones, PSTN trunks, Time Division Multiplexed or TDM slots or buses, Digital Signal Processors or DSP's, media gateways or port networks, routers, switches, servers, ports, and codecs, in each region/site, the relationships among the components, the amount (in Erlangs) of call traffic generated/received by each telephone during a selected time period, such as the busy hour, time-zone information, work-hour information, peak traffic levels and times, call directions, types of traffic (voice/non-voice, coded/uncoded, etc.), and the like.

In step 204, the communities of interest are identified according to defined rules/policies. This is typically performed by grouping like components (or components of the same type) in each region/site. What components are "like" components depends on the application. The determination can use factors, such as routing rules (e.g., circuit-switched or packet-switched), type or class of communication devices (e.g., IP softphones, IP hardphones, analog phones, digital phones, wireless phones, wireline phones, Personal Digital Assistants or PDA's, laptops, Personal Computers or PC's, routers, gateways, trunks, port networks, and the like), identity/business role of the device and/or the party associated with the device, physical location, network location, and the like. For example, all circuit-switched (analog and/or digital) telephones could be a first community of interest, all packet-switched (hard- and/or soft-) phones a second community of interest, all PSTN trunks a third community of interest, all TDM slots a fourth community of interest, all DSP's a fifth community of interest, and so on. Typically, the communication endpoints (e.g., phones, personal digital assistants, computers, and the like) are grouped together in one or more communities of interest as the endpoints generate and receive the traffic.

Figure 3:
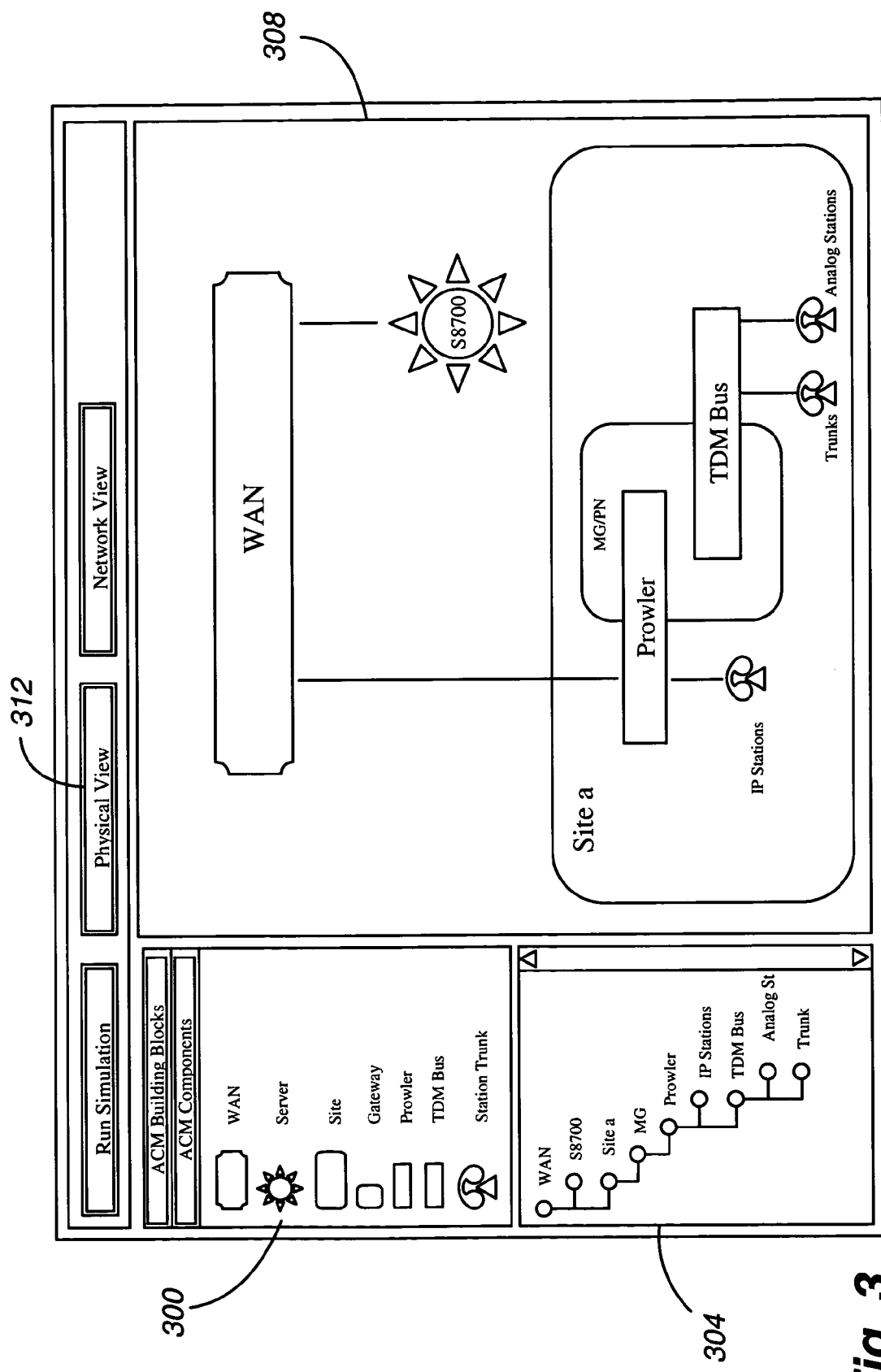
FIG. 3 depicts a graphical user interface according to an embodiment of the present invention.
Figure 4:
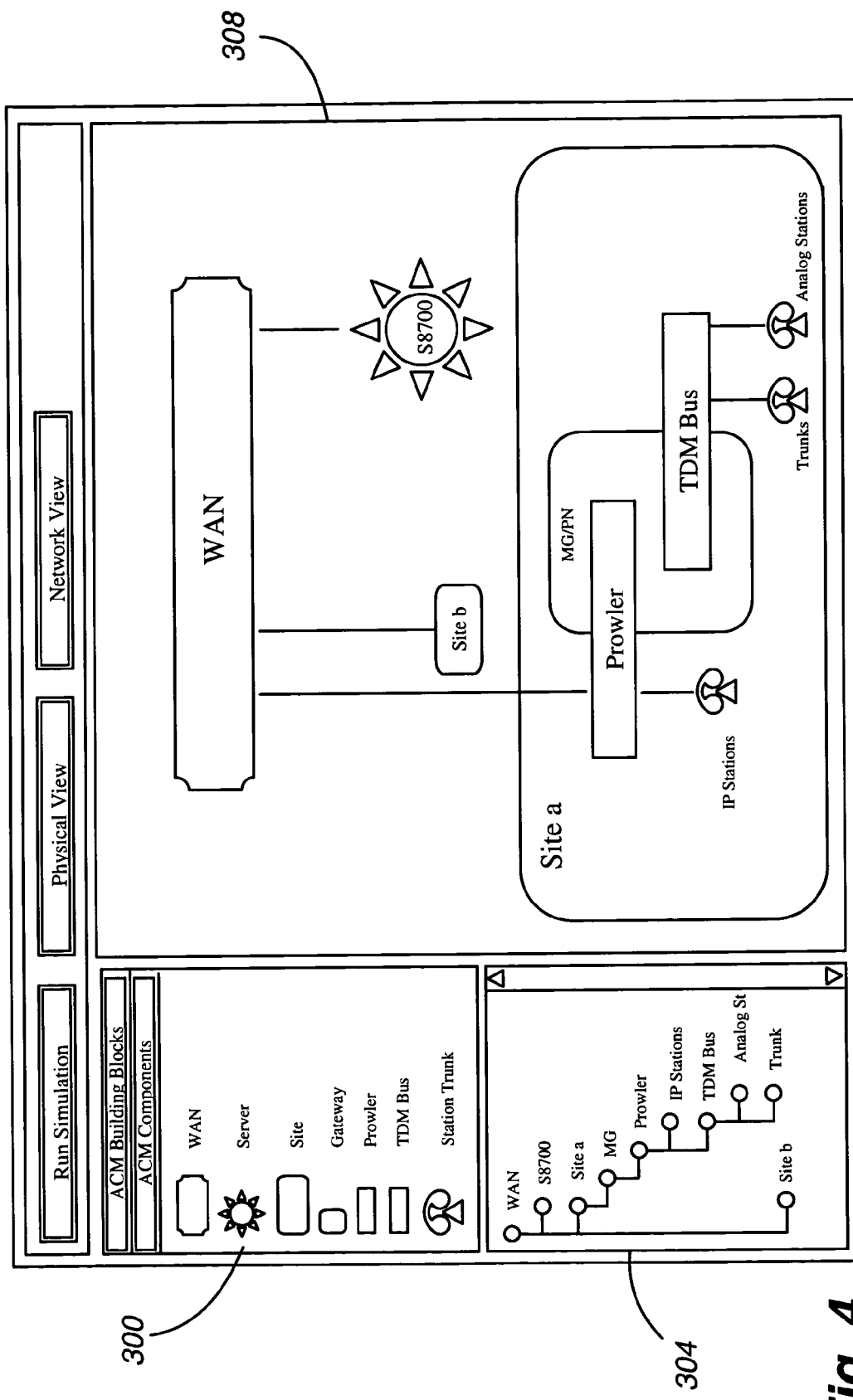
FIG. 4 depicts a graphical user interface according to an embodiment of the present invention.
Figure 5:
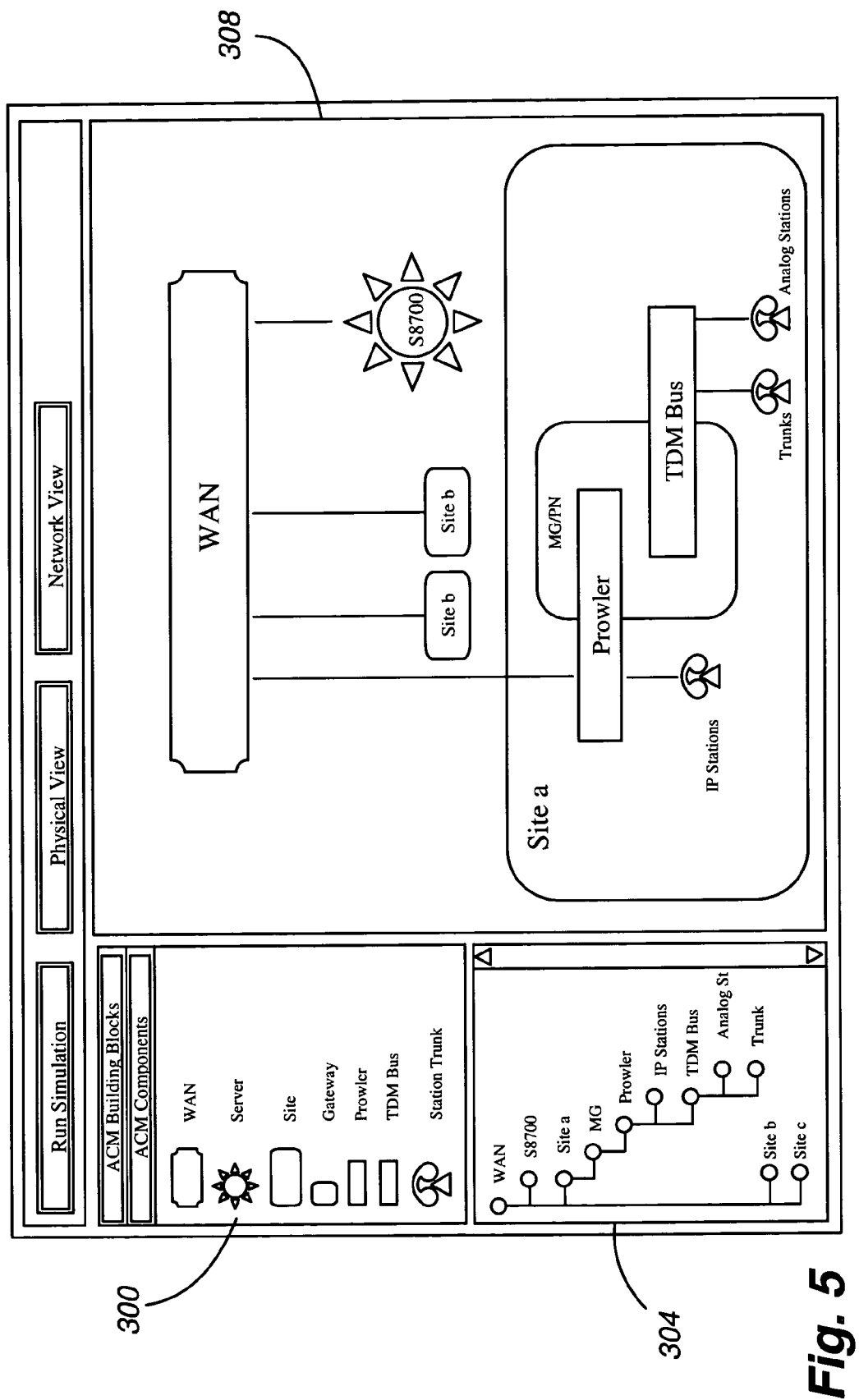
FIG. 5 depicts a graphical user interface according to an embodiment of the present invention.
Figure 6:
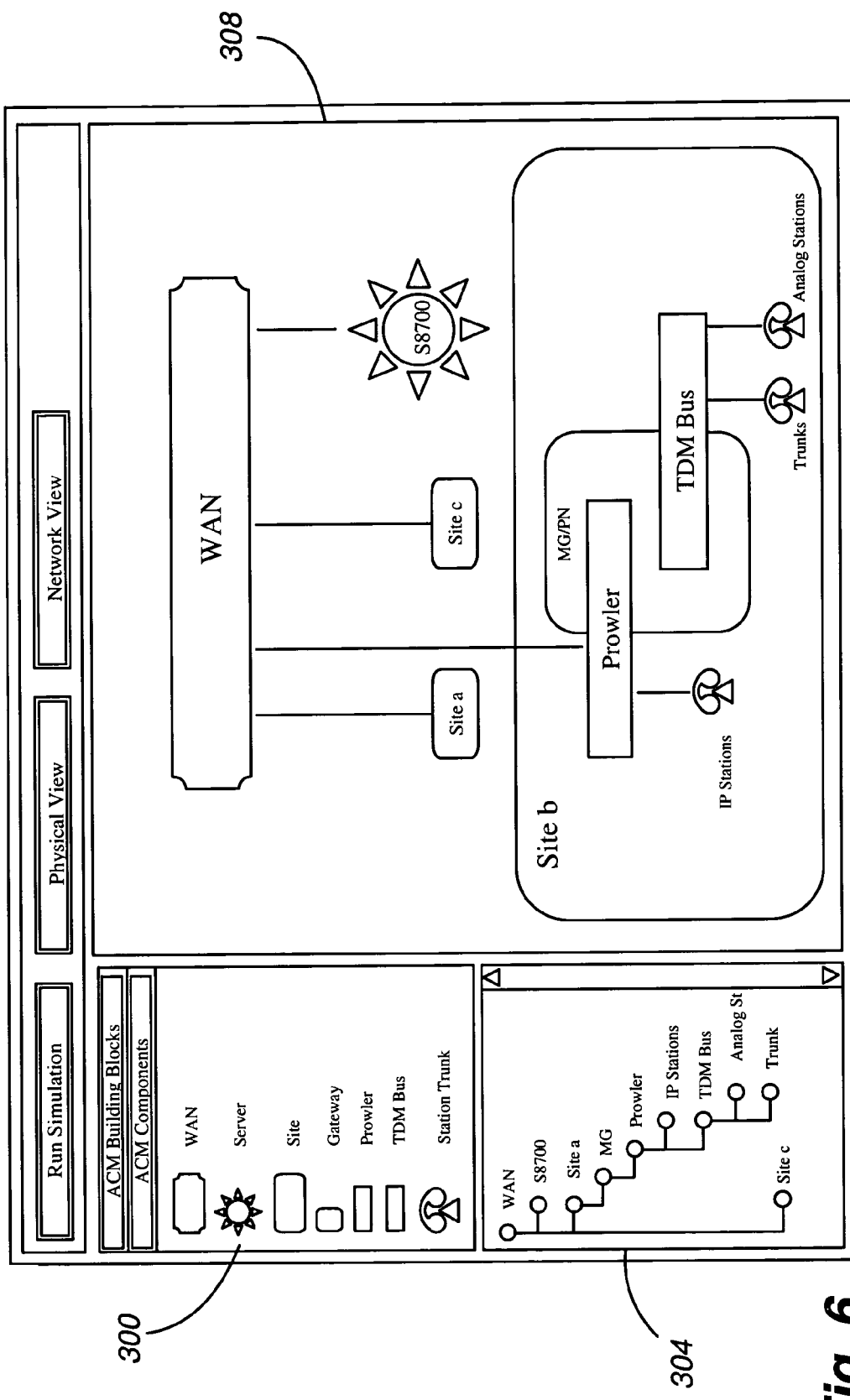
FIG. 6 depicts a graphical user interface according to an embodiment of the present invention.
Figure 7:
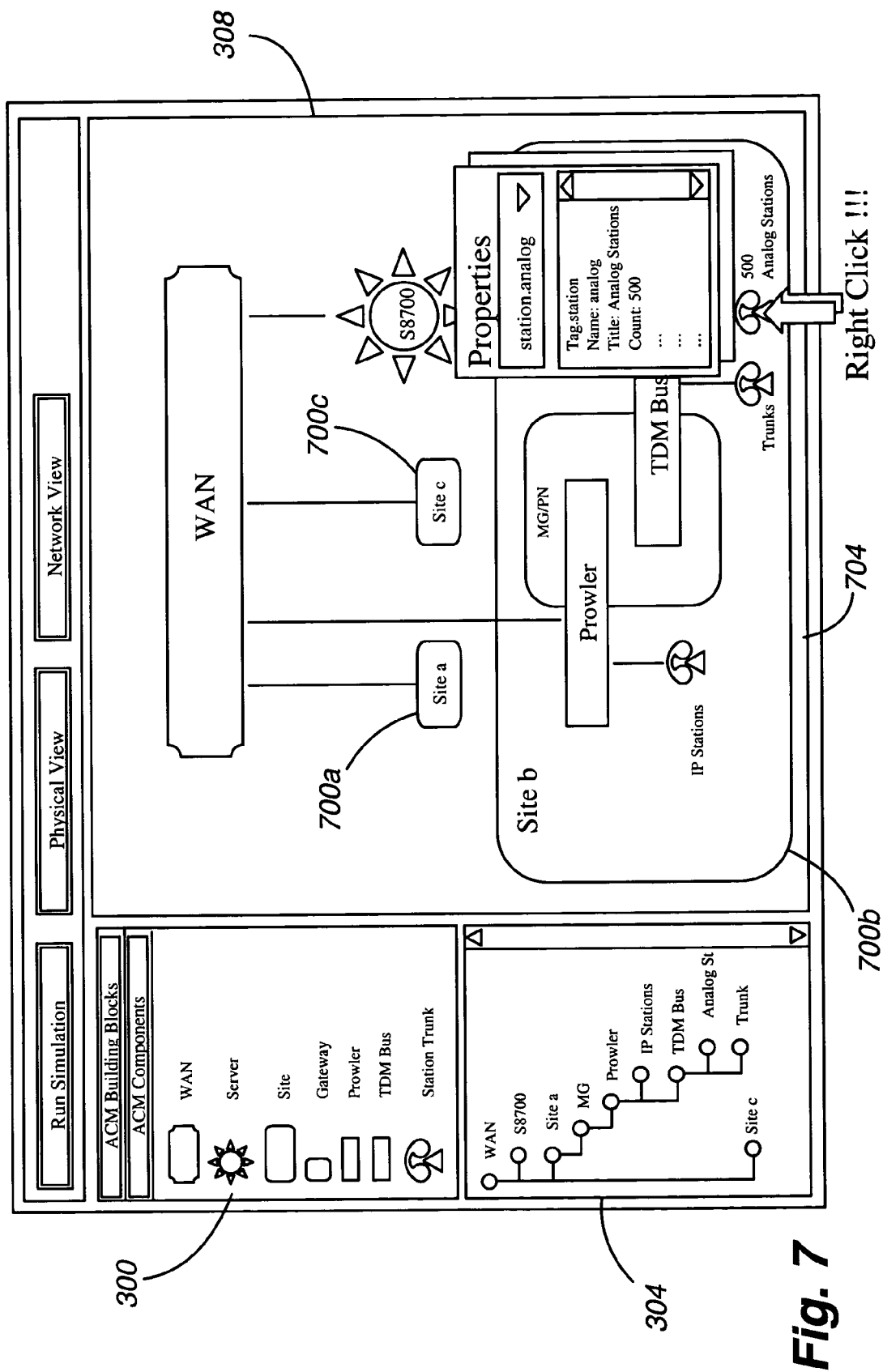
FIG. 7 depicts a graphical user interface according to an embodiment of the present invention.
Figure 8:
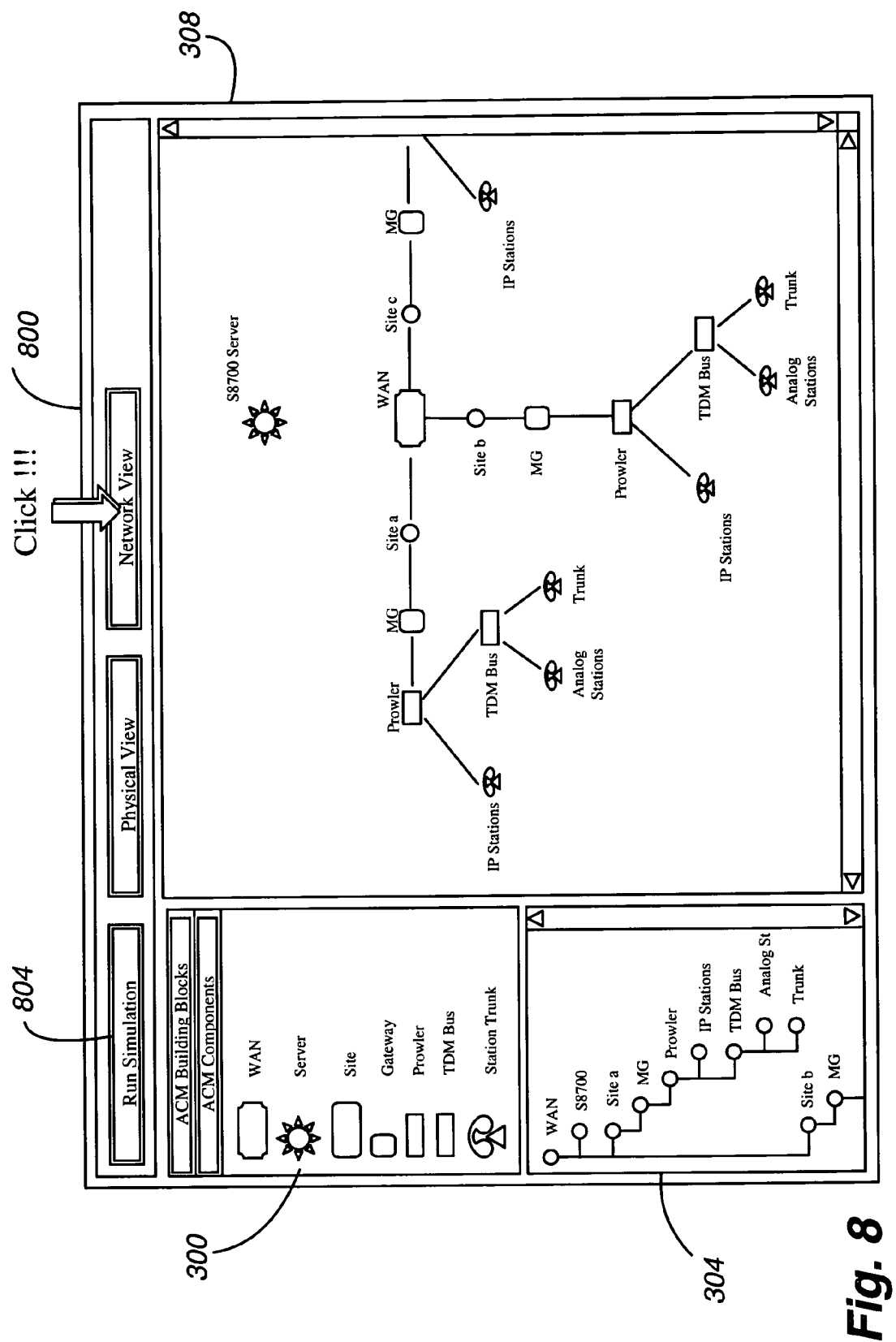
FIG. 8 depicts a graphical user interface according to an embodiment of the present invention.

In step 208, the logical characterization of the network is created according to a defined model, such as a hierarchical or wire model. Typically the model is defined by a markup language, such as XML. FIGS. 3-8 depict a Graphical User Interface or GUI for effecting this characterization. The drag-and-drop GUI supplies mechanisms for the specification of network topology and communities of endpoints, inter- and intra-site codecs, and the definitions of generic calling patterns. These specifications are generally sent from the GUI client to a server running the traffic flow analyzer. FIG. 3 shows the network element (e.g., server, site, gateway, Prowler™ (or a converter between packet-switched and circuit-switched telephony), TDM bus, and station/trunk) in window 300, the hierarchical structure of the network regions in window 304, and the hierarchical structure of a selected network region/site in a network design window 308. The physical view of the network is displayed in the network design window 308 when the user clicks on the "physical view" icon 312. FIG. 4 depicts a new site (site b) being added to the network hierarchy. FIG. 5 depicts another new site (site c) being added to the network hierarchy. FIG. 6 depicts the user dragging-and-dropping network elements from window 300 into the network design window 308 to construct the logical representation of site b. FIG. 7 shows that each endpoint symbol 700a-c, when clicked on, has a child window 704 providing information regarding the symbol, such as the type and number of stations. Finally, FIG. 8 shows that, by clicking on the "network view" icon 800, the entire physical network can be viewed simultaneously. The logical characterization of the network is preferably expressed in a markup language, such as XML, using macros for each network component and for the relationships between/among the network components/network regions/sites.

Figure 13:
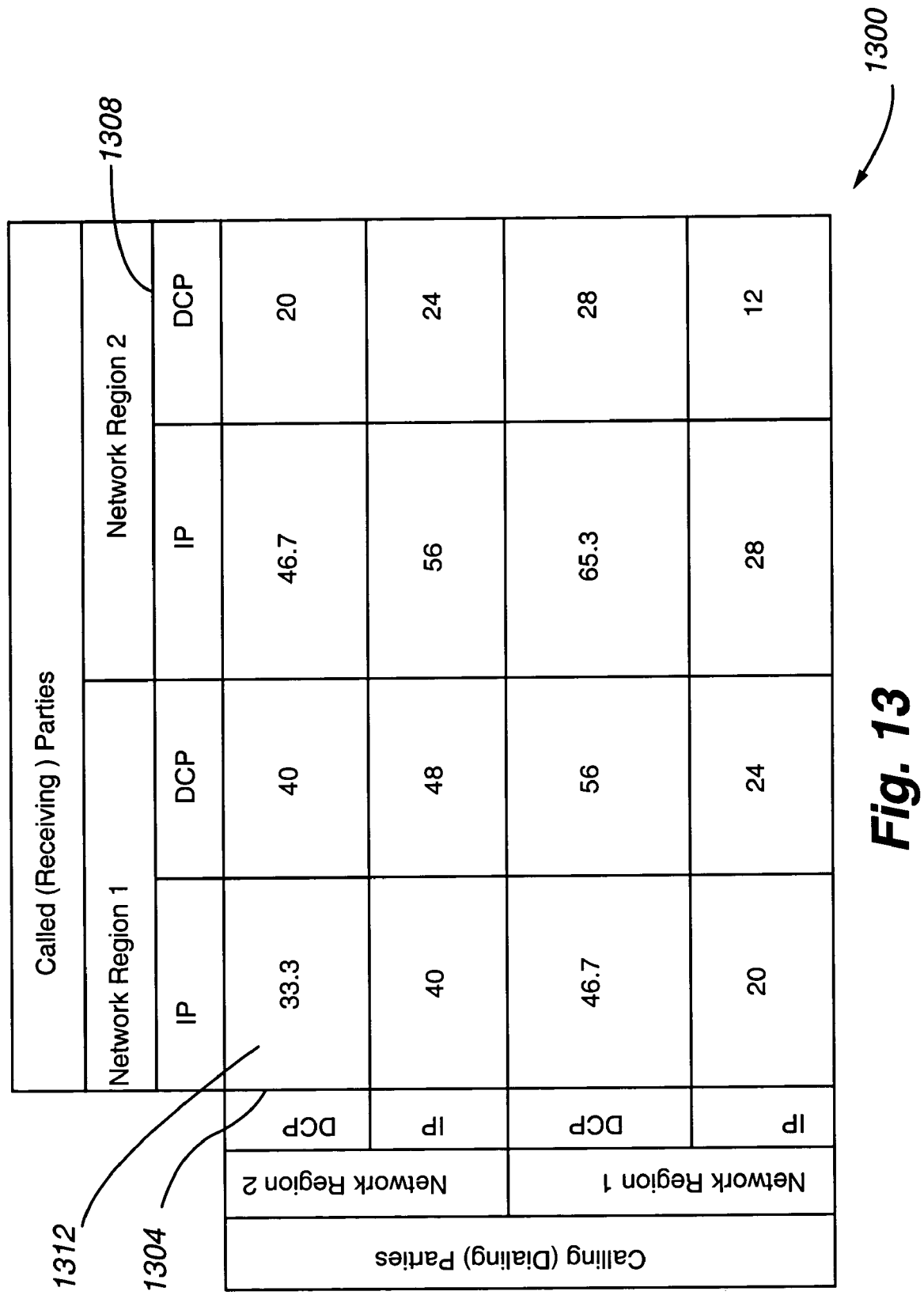
FIG. 13 is a community of interest matrix according to a first configuration.

In step 212, the bulk traffic is flowed through the logical characterization of the network and the traffic is aggregated at selected points/nodes in the network (which essentially populates the community of interest matrix of FIGS. 13 and 14). This operation is typically initiated by clicking on "run simulation" 804 in FIG. 8. Commonly, the analyzer loops once for each time unit (e.g., minute, hour, day, etc.) granularity. As will be appreciated, the simulation may also be done in one loop, such as when the traffic flow is for the busy hour. In one configuration, the simulation is run iteratively, with each iteration varying an amount or type of network component. When an optimum configuration is identified, the simulation is terminated. For example, the number of DSP's, gateway resources, trunks, and the like can be varied in each iteration. Alternatively and as discussed with reference to step 216, the aggregated bulk flows from one run can be used in mathematical equations to determine the optimum network configuration.

In performing the simulation of step 212, the traffic flows between/among/through the various communities of interest in each region/site are determined using selected rules. For example, the Uniform Distribution Model holds that each endpoint has an equal probability of generating/receiving a communication. Stated another way, when a telephone goes off hook to place a call to another telephone, it is equally likely to call any telephone in the system. As will be appreciated, other rules may be used depending on the routing/switching rules, the type and nature of traffic, the identities/roles of the endpoints and/or parties associated therewith, the nature of the enterprise, the number and roles of the network regions/sites, and the like. Using the resulting bulk traffic flows, the community of interest matrix, such as that in FIGS. 13-14 (discussed below), is generated. The typical matrix is two-dimensional, with one side of the matrix representing calling endpoint communities and the other side of the matrix called endpoint communities. On each side of the matrix, the communities are subdivided by network region/site identifier.

In one configuration, the analyzer 124 performs steps 200, 204, and 212 by adding default call shares (percent) to each network region/site, calculating call usage (Erlangs) at each region/site, inserting and calculating usage for each network region/site's group of calling endpoints, calculating total usage for each network region/site's group of called endpoints, and calculating inbound, outbound, and turnaround usage at specified domains in the network hierarchy (e.g., system, site, network region, media gateway, etc.).

In optional step 216, the accumulated traffic flows at selected nodes and the desired quality or grade of service are used with suitable mathematical equations to determine recommended resource requirements. Quantities of configurable materials dependent on traffic flow are calculated. An example of a suitable algorithm for determining optimum gateway capacity/configuration is discussed below with reference to the example. Other known equations can be used, for example, to determine capacity of digital signal processors, time slots, port networks, and the like.

Where the call pattern is comprised of a mixture of unencrypted and encrypted traffic using one or more codecs, the community of interest matrix includes in each row/column location the number of Erlangs of bulk traffic flow with a corresponding codec and encryption identifier. A conversion table (which indexes the codec and encryption identifier against the multiplication or conversion factor) is used to convert the bulk traffic flow to the corresponding uncompressed and unencrypted flow which is subsequently used to provision codec- and encryption-sensitive components such as Avaya Inc.'s Prowler™ boards.

Finally, in step 220, the output of the analyzer, which is recommended resource requirement(s), is provided to the configurator.

To illustrate the foregoing steps, an illustrative example will now be described with reference to FIGS. 12-15.

Figure 12:
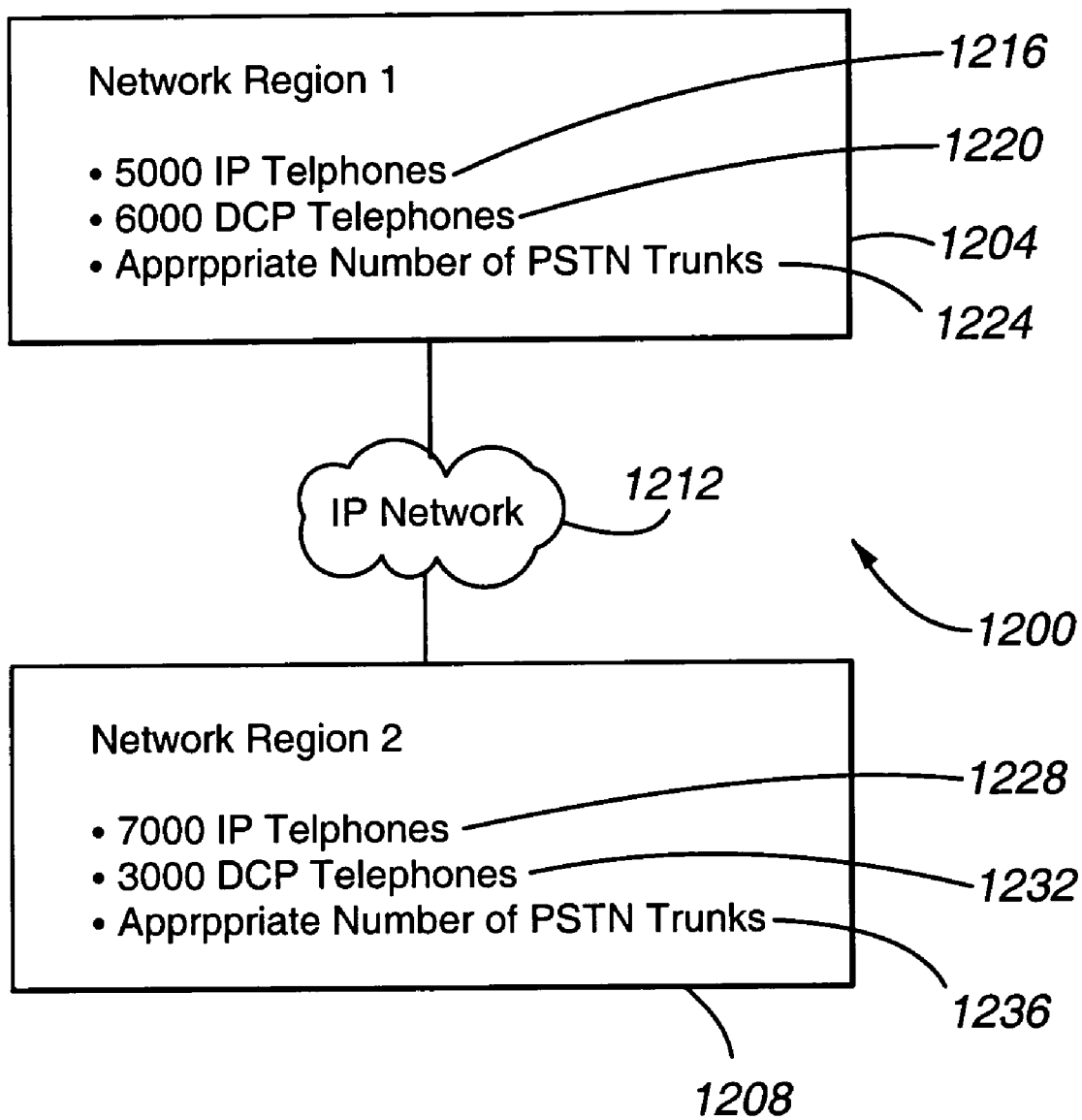
FIG. 12 is an illustrative example of a telecommunications network.

FIG. 12 depicts the input received from a customer in step 200. The network 1200 includes first and second network regions 1204 and 1208 interconnected by an IP network 1212. Each telephone (IP and DCP) generates 0.028 Erlangs of traffic to the population of other telephones and to the population of PSTN trunks, and receives 0.028 Erlangs of traffic from the population of PSTN trunks. The appropriate number of PSTN trunks at each region required to attain a desired grade of service (i.e., a suitably low blocking probability) is unknown.

In step 204, the IP phones 1216 in the first region 1204 are placed in a first community of interest, the digital (or DCP) telephones 1220 in the first region in a second community of interest, the PSTN trunks 1224 in the first region in a third community of interest, the IP phones 1228 in the second region are placed in a fourth community of interest, the digital (or DCP) telephones 1232 in the second region in a fifth community of interest, and the PSTN trunks 1236 in the second region in a sixth community of interest.

In step 208, the Uniform Distribution Model is used to determine the bulk or mass traffic flows between/among the communities of interest. Thus, no assumption is made that any phone is more likely to call phones in its own network region than phones in another network region. The Uniform Distribution Model implies that traffic is divided proportionally according to the populations of the various communities of called parties. The bulk traffic generated by the first community is 140 Erlangs, the second community is 168 Erlangs, fourth community is 196 Erlangs, and the fifth community is 84 Erlangs. Applying the Uniform Distribution Model, the 140 Erlangs of call traffic generated by the first network region IP phones is apportioned as follows:

NR1 IP phones→NR1 IP phones:

$$(140)\left[\frac{5000\ NR1\ IP\ \text{Phones}}{21{,}000\ \text{total phones in system}}\right] = 33.3\ \text{Erlangs}$$

NR1 IP phones→NR1 DCP phones:

$$(140)\left[\frac{6000}{21{,}000}\right] = 40\ \text{Erlangs,}$$

NR1 IP phones→NR2 IP phones:

$$(140)\left[\frac{7000}{21{,}000}\right] = 46.7\ \text{Erlangs,}$$

NR1 IP phones→NR2 DCP phones:

$$(140)\left[\frac{3000}{21{,}000}\right] = 20\ \text{Erlangs,}$$

where NR1 is the first network region and NR2 the second network region.

The same apportionment approach is applied to the traffic flow generated by the remaining second, fourth, and fifth communities.

Using the apportioned traffic flows, the first community of interest matrix 1300 of FIG. 13 is generated (which depicts intercom calls). The vertical axis 1304 represents the calling (dialing) parties or phones while the horizontal axis 1308 represents the called (receiving) parties. The communities on each axis are further identified by network region. Thus, entry 1312 indicates that, during the pertinent time period such as the busy hour, 33.3 Erlangs of traffic results from calls between IP phones of the first community 1216.

To complete step 208, the PSTN trunk traffic must be estimated. It is assumed that the PSTN trunk traffic involving telephones in the first network region 1204 will use first network region trunks (in the third community 1224) while PSTN trunks involving telephones in the second network region 1208 will use second network region trunks (or the sixth community 1236). This assumption permits the creation of the final (revised) community of interest matrix of FIG. 14, which includes PSTN trunk calls as well as intercom calls.

The final matrix of FIG. 14 represents the call traffic (expressed in Erlangs) from any given community of endpoints to any other given community of endpoints. The numbers above were calculated using the Uniform Distribution Model, the given assumptions for how much traffic each phone generates, and the assumption that phones only use trunks in their own network region. It is also assumed that there is no tandeming (i.e., PSTN trunk to PSTN trunk connections).

Figure 15:
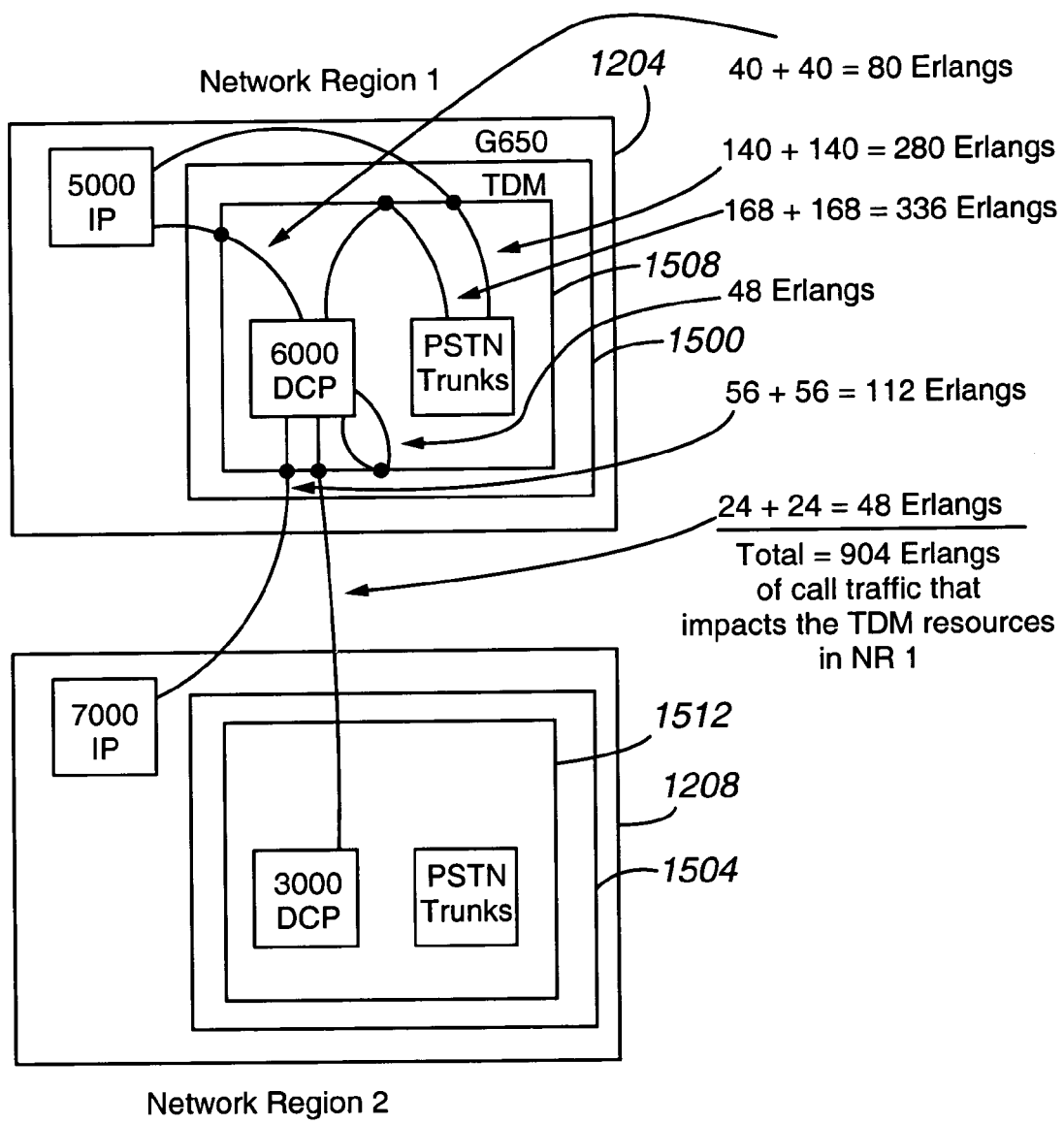
FIG. 15 illustrates bulk traffic flows through the telecommunications network.

Steps 212 and 216 are now performed to determine the required number of Avaya Inc. G650™ gateway resources. These resources are grouped together in a seventh community of interest (not shown). Each gateway supplies a resource known as TDM time slots. To ensure that at most 1 in 1000 calls are blocked at this resource (i.e., to ensure a P001 grade of service), each gateway's TDM time slots must carry no more than 204.5 Erlangs of call traffic. This value is determined using the desired grade of service and the Erlang B formula provided above in the Background. Other formulas, such as the Molina formula, Erlang C formula, and binomial formula, may alternatively be employed. As will be appreciated, differing grades of service will yield differing values for the maximum TDM time slot traffic flow. However, not all call types require TDM time slots. First, assume that each of the first and second network regions 1204 and 1208 have only one gateway resource 1500 and 1504, respectively. FIG. 15 illustrates the bulk call flows from step 212 for the various call types which use the TDM resources 1508 and 1512 in the first and second network regions, respectively. For example, the bulk call flow between the first and second communities 1216 and 1220 passing through the gateway resource 1508 is 80 Erlangs (2×40 Erlangs (see entry 1400 of FIG. 14)), between the first and third communities 1216 and 1224 is 280 Erlangs (2×140 Erlangs (see entry 1404 of FIG. 14)) and so on to yield a total bulk traffic flow of 904 Erlangs. The preceding multiplication factors of 2 were introduced to account for both calls being initiated and calls being received by the relevant endpoint(s).

The TDM resources 1508 in the first network region 1204 need to carry 904 Erlangs of call traffic. However, a single gateway resource's TDM resources 1508 can only carry up to 204.5 Erlangs of call traffic to realize the required grade of service. Clearly, more gateway resources 1500 are needed in the first network region 1204. The question of how many gateway resources 1500 is not simple. This is so because a call between distinct gateway resources, even within a single network region, require a TDM resource from each gateway resource involved. If N represents the number of gateway resources required in the first network region to realize the desired grade of service, the value of N must be determined.

FIG. 15, which is also derived during step 212, indicates that some of the call traffic flow that impacts TDM resources 1508 in the first network region 1204 passes through the TDM resources to other communities in the first and second network regions 1204 and 1208 while the remainder stays within the framework of the first network region's TDM resources. More specifically, the traffic flow passing through the TDM resources 1508 to other populations is 80 Erlangs+280 Erlangs+112 Erlangs+48 Erlangs or 520 Erlangs while the traffic flow staying within the framework of the TDM resources 1508 in the first network region 1204 is 336 Erlangs+48 Erlangs or 384 Erlangs. The total of 520 Erlangs and 384 Erlangs is the total traffic flow of 904 Erlangs referenced previously.

Traffic that passes through the first network region TDM resources 1508 will do so regardless of how many gateway resources 1500 there are; that is, a TDM resource 1508 is not required from multiple gateway resources 1500 for those types of calls. On the other hand, traffic that stays within the framework of the first network region 1204 (or turnaround or looped calls) requires one TDM resource (or time slot) per call between phones in the same gateway resource or one TDM resource per call per gateway resource for calls between phones in different gateway resources (i.e., such calls require a total of two TDM resources in the first network region). Nominally, the fraction of calls that stay within a single gateway resource is 1/N, wherein N is the number of gateways resources in the first network region, and the fraction of calls between two gateway resources is (N−1)/N. Accordingly, the total traffic carried by gateway resources in the first network region is:

(520 Erlangs)(1 TDM resource per call) +

$$\left(\frac{1}{N}\right) (384 \text{ Erlangs})(1 \text{ } TDM \text{ resources per call}) +$$

$$\left(\frac{N-1}{N}\right) (384 \text{ Erlangs})(2 \text{ } TDM \text{ resources per call}) =$$

$$520 + \left(\frac{1}{N}\right)(384) + (2)\left(\frac{N-1}{N}\right)(384) = 520\left(\frac{2N-1}{N}\right)(384)$$

Since this is the total, then the total per G650™ is obtained simply by dividing by N:

$$TDM \text{ traffic per } G650^{TM} = \frac{520}{N} + \left(\frac{2N-1}{N^2}\right)(384)$$

Thus, the smallest value of N needs to be found such that the TDM traffic per G560 is at most 204.5.

As noted with reference to step 212, when N is one there are 904 Erlangs at the TDM resources in the first network region—which is much too high for the desired grade of service. In step 216, the required value of N for the desired grade of service could be determined iteratively by setting N equal to a first value, simulating traffic flow and, depending on the traffic flow through the gateway resources in the first network region, setting N equal to a second value and again simulating traffic flow. These steps are repeated until the traffic flow through the gateway resources is no more than 204.5 Erlangs. Because this is computationally demanding, it is preferred to use mathematical techniques instead.

To obtain the value of N without iteration, the following mathematical equation is employed:

$$N \geq \left\lceil \frac{(u_t + u_r) + \sqrt{(u_t + u_r)^2 - (4)(u_r)(u_{GOS})}}{(2)(u_{GOS})} \right\rceil$$

where $U_t$ is the total bulk traffic flow at a selected community of resources (e.g., gateway resources), $U_r$ is the amount of the total bulk traffic flow that stays within the selected community of resources (e.g., is reflected back or turns around at the TDM resources 1508 in FIG. 15); and $U_{GOS}$ is the maximum total bulk traffic flow that may be handled by the selected resource community to realize the desired grade of service. Applying this equation with the selected community being the gateway resources yields the following:

$$N \geq \left\lceil \frac{(904 + 384) + \sqrt{(904 + 384)^2 - (4)(384)(204.5)}}{(2)(204.5)} \right\rceil = 5.98$$

Thus, six G650s™ should be used in the first network region.

As will be appreciated, the same steps are used to determine the number of gateway resources required by the second network region to realize the desired grade of service.

The Operation of the Resource Provisioning System

The operation of the entire resource provisioning system will now be described with reference to FIGS. 2-11.

Figure 9:
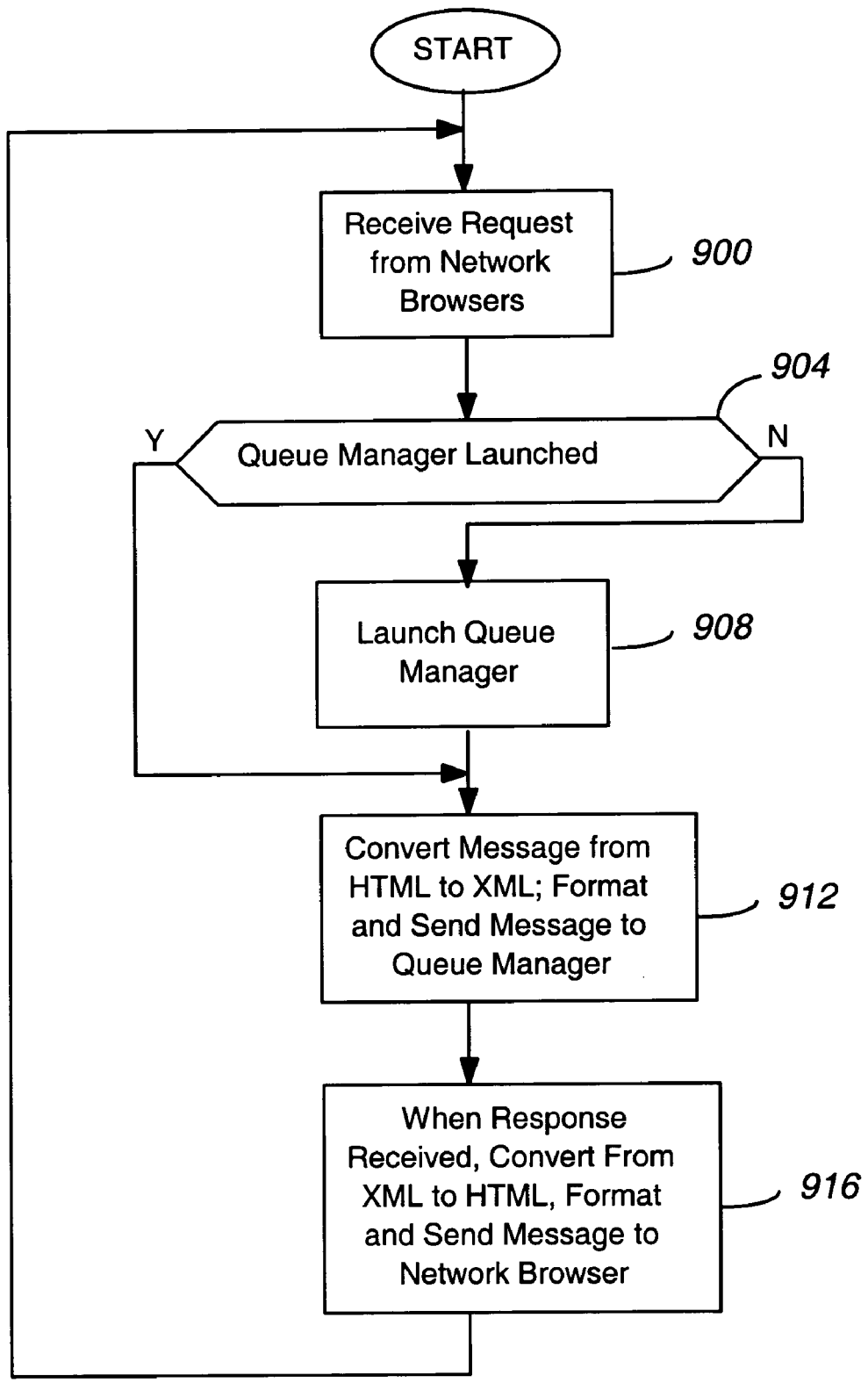
FIG. 9 is a flowchart depicting operation of the network server according to an embodiment of the present invention.

Referring to FIG. 9, the user via the network browser 104 sends a request for a configurator output to the network server 112, and in step 900 the request is received by the network server 112. In decision diamond 904, the network server 112 determines from the queue manager 116 whether or not the transaction has been launched. If not, the network server 112 in step 908 issues command line instructions in the markup language to create a message queue for the transaction and launch the configurator 128. If not or as part of launching the queue manager 116, the web server, in step 912, converts the request message payload from HTML to XML, formats, and sends the message payload to the queue manager 116. The payload may be provided as part of the command line instructions or as a subsequently sent message.

Figure 10:
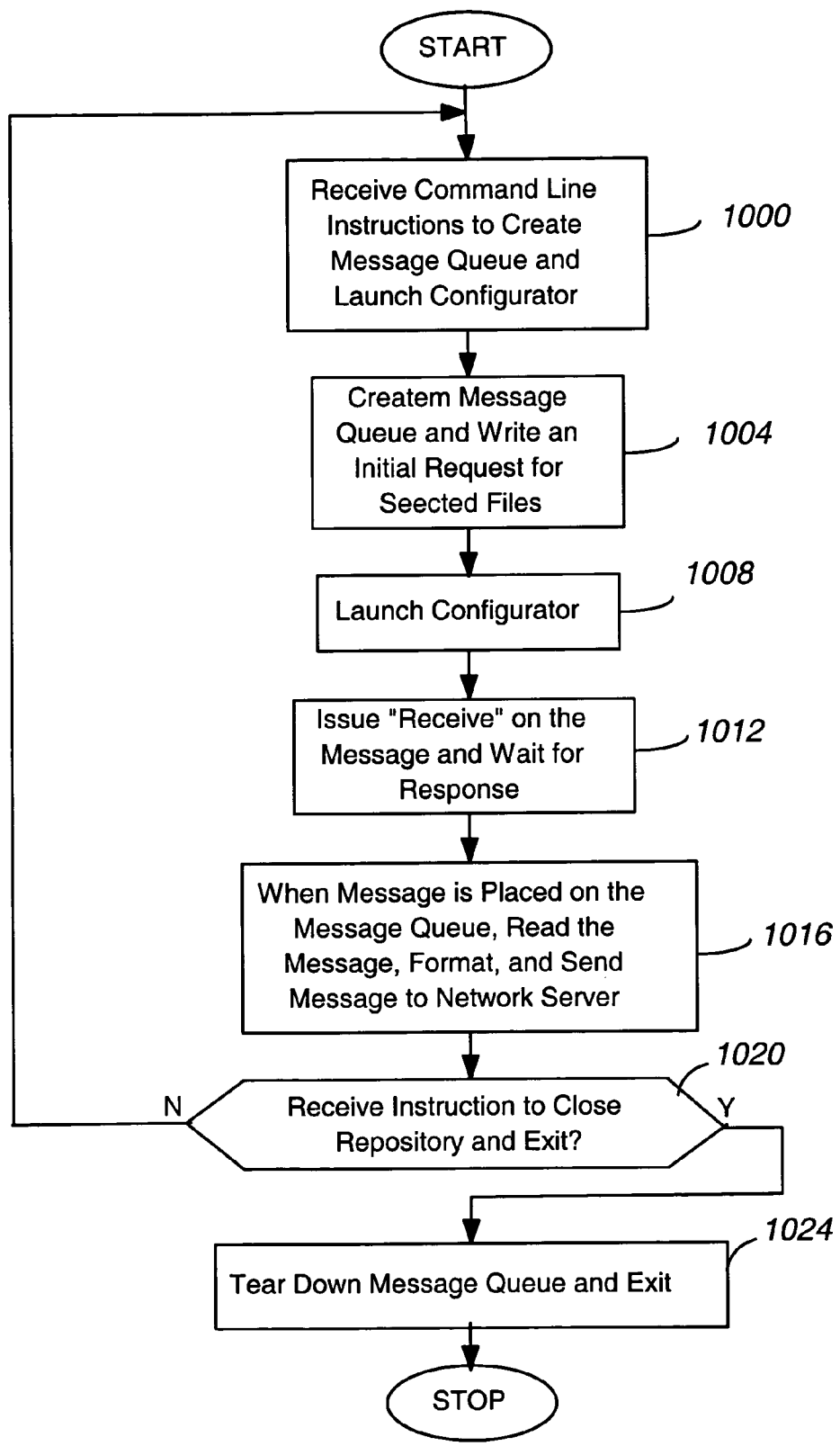
FIG. 10 is a flowchart depicting operation of the queue manager according to an embodiment of the present invention.

Referring now to FIG. 10, the queue manager 116 in step 1000 receives the command line instructions and in step 1004 creates the message queue 120 for the transaction and writes to the message queue 120 an initial request in the markup language for selected output files of the configurator 128. In step 1008, the queue manager, using a markup language "<send>" command then sends a message to the configurator 128 to process the request. Finally, in step 1012 the queue manager 116 issues a markup language "<receive>" command on the message queue and waits for a response.

Other commands that may be used among the components, include the "<listen>", "<accept>", "<receivexml>", "<sendfile>", "<sendxml>", and "<release>". The <listen> statement creates a socket for incoming connections, binds to the socket, then marks the socket so it will listen for incoming connections. The <accept> statement waits on the socket for a client to connect. The <receivexml> statement receives an XML structure into its reference. The incoming XML string is expected to terminate with a single null (binary zero) character. The statement uses a temporary file to hold the data incoming from the network. This file has a name like socket-recvnnn.xml, where the nnn is the product identifier or PID of the server (MTG) process, and the file is removed (unlinked) after the receipt of data is complete. If the <path> attribute is specified, it overrides this temporary file name. In this case, or if an error event is triggered by the <receivexml> statement, the file is not removed after data receipt. The <send> statement sends a message, contained in its <value> attribute, to a connected client. The message is terminated with a single null (binary zero) character. The <sendfile> statement sends the contents of a file, terminated with a single null (binary zero) character, to a connected client. The <sendxml> statement acts like a <printxml> statement; it prints a referenced XML structure, and sends it, terminated with a single null (binary zero) character, to a connected client. The statement uses a temporary file to hold the printed XML structure. This file has a name like socketsendnnn.xml, where the nnn is the PID of the server (MTG) process, and the file is removed (unlinked) after the data is sent. If the <path> attribute is specified, it overrides this temporary file name. In this case, or if an error event is triggered by the <sendxml> statement, the file is not removed after the data is sent. The <release> statement closes the client socket.

Figure 11:
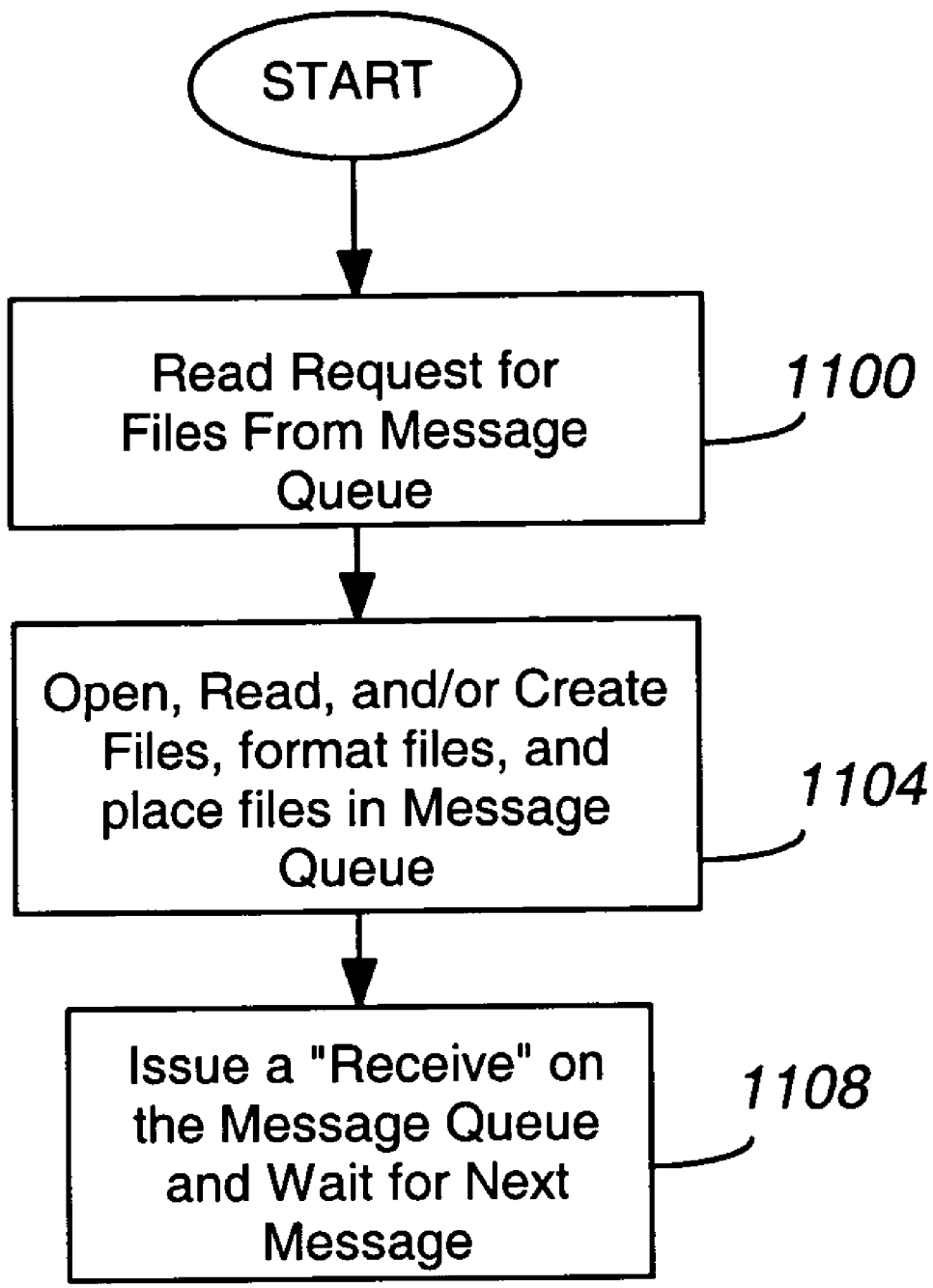
FIG. 11 is a flowchart depicting operation of the configurator according to an embodiment of the present invention.

Referring now to FIG. 11, the processing of the request by the configurator 128 will now be described. In step 1100, the configurator 128 reads the request for the output files in the message queue 120. In step 1104, the configurator 128 opens, reads, and/or creates the requested output files (which are typically a bill of materials). The configurator 128 then formats the files and places the output files (which are in the markup language) in the message queue 120. If the files have not yet been generated, the configurator 128 requests output from the traffic flow analyzer 124 based on the network topology that is the subject of the request. When the output is received, the configurator 128 processes the output to yield the requested output files. The configurator 128 in step 1108 then issues a "<receive>" command on the message queue 120 and waits for the next message in the transaction.

Referring now to step 1016 of FIG. 10, the queue manager 116, when the message is placed in the message queue 120 by the configurator 128, reads, formats, and sends the message to the network server 112. In decision diamond 1020, the queue manager 116 determines whether or not it has received an instruction to close the message queue repository and exit. If not, the queue manager 116 returns to step 1000 and awaits the next command line instructions from the network server 112. If so, the queue manager 116 in step 1024 tears down the message queue 120 and exits. Before exiting, the connection between the network server 112 and queue manager 116 associated with the transaction is maintained. The queue manager 116 may forward a command to the configurator 128 to terminate processing the transaction.

Referring to step 916 of FIG. 9, the network server 112, when the message response is received from the queue manager 116, converts the message payload from XML to HTML (or java script) and formats and sends the message to the network browser 104. The network browser 104 receives the message and displays it to the user. The user may select a further option on the display or otherwise request additional information. In that event, a request message is sent to the network server 112 and the above process repeated.

The above architecture is persistent or stateful in that, during the transaction, the configurator 128 and queue manager 116 are processing or awaiting processing of messages relating to the transaction. Stated another way, when not actively processing messages the configurator 128 and queue manager 116 are "sleeping."

A number of variations and modifications of the invention can be used. It would be possible to provide for some features of the invention without providing others.

For example in one alternative embodiment, the traffic analyzer is used for applications other than network provisioning. The analyzer can be used to simulate traffic flow through an existing network to identify network configurations for optimal network performance. Such simulations may use realtime traffic flow information gathered by probes located at selected points in the network. In this embodiment, macro-defined date rules can be used to condition network attributes into or out of "existence" and/or qualify the values of attributes.

In another alternative embodiment, the traffic flow analyzer may be used for traffic other than or in addition to call or voice traffic. For example, the traffic can be nonvoice traffic, such as instant messaging, Short Message Service or SMS, chat, email, facsimile, pager, signaling, data transfer, and the like. The analyzer is particularly useful in determining resource requirements for real time traffic in which the sender and receiver are simultaneously on line during exchanges of communications.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for analyzing at least a portion of a telecommunications network, comprising:
   (a) a processor assigning a plurality of network components to at least first, second, and third groupings of components, wherein the first and second groupings of components correspond to communication endpoints, wherein the members of the first grouping of components are a common first type of communication endpoint and the members of the second grouping of components are a common second type of device, and wherein the first and second types of communication endpoint are different;
   (b) the processor determining bulk traffic flows at least one of generated and received by the first and second groupings of components and passing through the third grouping of components, wherein determining bulk traffic flows comprises:
      (B1) determining a first fraction of first traffic generated by the first grouping of components that terminates on the second grouping of components;
      (B2) determining a second fraction of second traffic generated by the second grouping of components that terminates on the first grouping of components;
      (B3) based on the first and second fractions, propagating simulated traffic through the third grouping of components and between the first and second groupings of components; and
      (B4) during simulation, recording a traffic volume passing through the third grouping of components;
   (c) based on the bulk traffic flow passing through the third grouping of components, the processor determining a requirement for the third grouping of components to realize a selected grade and/or quality of service, wherein the bulk traffic flow is the total recorded traffic volume passing through the third grouping of components; and
   (d) the processor creating a logical characterization of the at least a portion of the telecommunications network, wherein the logical characterization defines the relationships among the first, second, and third groupings of components.

2. The method of claim 1, wherein the first grouping of components comprises at least one of packet-switched and circuit-switched communication devices, the second grouping of components comprises the other of the at least one of packet-switched and circuit-switched communication devices, wherein the bulk traffic flows refer to the total traffic flow between the first and second groupings of components, wherein all of the communication endpoints in the first grouping of components handle a same type of traffic and all of the communication endpoints in the second grouping of components handle a same type of traffic, and the network components in the third grouping of components comprise at least one of switches, routers, digital signal processors, gateway resources, time division multiplexed slots, time division multiplex buses, trunks, ports, codecs, and port networks.

3. The method of claim 1, wherein the logical characterization is a wire model in a markup language, wherein the members of the first grouping of components generate and/or receive the same type of traffic, wherein the members of the second grouping of components generate and/or receive the same type of traffic, wherein all of the members of the first grouping of components are the same type of communication endpoint, wherein all of the members of the second grouping of components are the same type of communication endpoint, and wherein the bulk traffic flows are associated with a busy hour.

4. The method of claim 1, wherein, in the determining step, a community of interest matrix is generated, a first axis of the community of interest matrix being associated with called endpoints in the first and second groupings of components and a second axis being associated with calling endpoints in the first and second groupings of components, wherein the first and second types of communication endpoints are based on the type of traffic the endpoints generate and/or receive, and wherein step (b) comprises the sub-steps:
   (B1) flowing bulk traffic flows through a logical characterization of the network; and
   (B2) aggregating bulk traffic flow for the first, second, and third groupings of components, thereby populating the community of interest.

5. The method of claim 1, wherein the requirement is quantity and/or capacity, wherein the first, second, and third groupings of components are part of a first community of interest matrix and further comprising after and based on the requirement determined in the determining step:
   (d) formulating a second community of interest matrix that is different and has more rows and/or columns than the first community of interest matrix, the second community of interest matrix having fourth, fifth, sixth, and seventh groupings of components of communication endpoints; and (e) determining second bulk traffic flows generated and/or received by the fourth, fifth, sixth, and seventh groupings of components to verify the requirement of the determining step (c).

6. The method of claim 1, wherein the network comprises multiple geographically distributed and dislocated sites, wherein the first grouping of components is associated with a first network site and the second grouping of components is associated with a second network site, wherein step (b) comprises the sub-steps:
(B1) assigning default call shares to each of the first and second network sites;
(B2) based on the assigned call shares, calculating call usage at each of the first and second network sites;
(B3) based on the call usages calculated in step (B2), calculating usage of each of the called and calling endpoints in the first and second groupings of components; and
(B4) calculating inbound, outbound, and turnaround call usage at each of the first and second network sites and further comprising:
(d) converting encrypted bulk traffic flows to corresponding unencrypted bulk traffic flows using at least one conversion factor.

7. The method of claim 1, wherein the requirement for the third grouping of components is the required quantity of the components to realize a selected grade and/or quality of service and wherein the required quantity N of the components is determined based on the following equation:

$$N \geq \left\lceil \frac{(u_t + u_r) + \sqrt{(u_t + u_r)^2 - (4)(u_r)(u_{GOS})}}{(2)(u_{GOS})} \right\rceil$$

where $U_t$ is the total bulk traffic flow through the third grouping of components, $U_r$ is the amount of the total bulk traffic flow that remains within the third grouping of components, and $U_{GOS}$ is the maximum total bulk traffic flow that may be handled by the third grouping of components to realize the desired grade and/or quality of service.

8. The method of claim 1, wherein the determining step (b) is repeated for each possible traffic pathway between each possible pair of communication endpoints in the first and second groupings of components and further comprising:
(d) determining a bill of material based on the determined requirement of step (c).

9. The method of claim 1, wherein the first grouping of components is in a first network region and the second grouping of components is in a second network region and wherein step (b) comprises the substeps:
(B1) determining, for each member of the first and second groupings of components, a respective amount of traffic generated and received by the member;
(B2) using a Uniform Distribution Model to determine, for each of the first and second groupings of components, respective bulk traffic flows;
(B3) populating a community of interest matrix, wherein a first axis of the matrix represents calling endpoints and a second axis, orthogonal to the first axis, represents called endpoints; and
(B4) determining a bulk traffic flow passing through the third grouping of components.

10. A computer readable medium comprising processor executable instructions that, when executed, perform the steps of claim 1.

11. A system for analyzing at least a portion of a telecommunications network, comprising:
a server comprising a processor and a memory, the processor operable to execute a traffic flow analyzer, the traffic flow analyzer operable to: (a) assign a plurality of network components to at least first, second, and third groupings of components, wherein the first and second groupings of components correspond to communication endpoints, wherein the members of the first grouping of components are a common first type of communication endpoint and the members of the second grouping of components are a common second type of device, and wherein the first and second types of communication endpoint are different; (b) determine bulk traffic flows at least one of generated and received by the first and second groupings of components and passing through the third grouping of components; and (c) based on the bulk voice traffic flow passing through the third grouping of components, determine a requirement for the third grouping of components to realize a selected grade and/or quality of service, wherein the requirement for the third grouping of components is the required quantity of the components to realize a selected grade and/or quality of service and wherein the required quantity N of the components is determined based on the following equation:

$$N \geq \left\lceil \frac{(u_t + u_r) + \sqrt{(u_t + u_r)^2 - (4)(u_r)(u_{GOS})}}{(2)(u_{GOS})} \right\rceil$$

where $U_t$ is the total bulk traffic flow through the third grouping of components, $U_r$ is the amount of the total bulk traffic flow that remains within the third grouping of components; and $U_{GOS}$ is the maximum total bulk traffic flow that may be handled by the third grouping of components to realize the desired grade and/or quality of service.

12. The system of claim 11, wherein the first grouping of components comprises at least one of packet-switched and circuit-switched communication devices, the second grouping of components comprises the other of the at least one of packet-switched and circuit-switched communication devices, wherein the bulk traffic flows refer to the total traffic flow between the first and second groupings of components, wherein all of the communication endpoints in the first grouping of components handle a same type of traffic and all of the communication endpoints in the second grouping of components handle a same type of traffic, and the network components in the third grouping of components comprise at least one of switches, routers, digital signal processors, gateway resources, time division multiplexed slots, time division multiplex buses, trunks, ports, codecs, and port network.

13. The system of claim 11, wherein the traffic flow analyzer is further operable to (d) create a logical characterization of the at least a portion of the telecommunications network, wherein the logical characterization defines the relationships among the first, second, and third groupings of components and wherein the traffic flow analyzer:
(B1) determines a first fraction of first voice traffic generated by the first grouping of components that terminates on the second grouping of components;
(B2) determines a second fraction of second voice traffic generated by the second grouping of components that terminates on the first grouping of components;

(B3) based on the first and second fractions, propagates simulated voice traffic through the third grouping of components and between the first and second groupings of components;

(B4) during simulation, records a voice traffic volume passing through the third grouping of components; and wherein the bulk voice traffic flow passing through the third grouping of components is the total recorded traffic volume passing through the third grouping of components.

14. The system of claim 13, wherein the logical characterization is a wire model in a markup language, wherein the members of the first grouping of components generate and/or receive the same type of traffic, wherein the members of the second grouping of components generate and/or receive the same type of traffic, wherein all of the members of the first grouping of components are the same type of communication endpoint, wherein all of the members of the second grouping of components are the same type of communication endpoint, and wherein the bulk traffic flows are associated with a busy hour.

15. The system of claim 11, wherein, in the determining operation, a community of interest matrix is generated, a first axis of the community of interest matrix being associated with called endpoints in the first and second groupings of components and a second axis being associated with calling endpoints in the first and second groupings of components, and wherein the first and second types of communication endpoints are based on the type of traffic the endpoints generate and/or receive, and wherein the traffic flow analyzer:

(B1) flows bulk traffic flows through a logical characterization of the network; and (B2) aggregates bulk traffic flow for the first, second, and third groupings of components, thereby populating the community of interest.

16. The system of claim 11, wherein the requirement is quantity and/or capacity, wherein the first, second, and third groupings of components are part of a first community of interest matrix and wherein the analyzer is further operable to (d) formulate a second community of interest matrix, after and based on the requirement determined by operation (c), that is different and has more rows and/or columns than the first community of interest matrix, the second community of interest matrix having fourth, fifth, sixth, and seventh groupings of components of communication endpoints and (e) determine second bulk traffic flows generated and/or received by the fourth, fifth, sixth, and seventh groupings of components to verify the requirement of the determining step (c).

17. The system of claim 11, wherein the traffic flow analyzer is further operable to (d) convert encrypted bulk traffic flows to corresponding unencrypted bulk traffic flows using at least one conversion factor, wherein the network comprises multiple geographically distributed and dislocated sites, wherein the first grouping of components is associated with a first network site and the second grouping of components is associated with a second network site, wherein the traffic flow analyzer:

(B1) assigns default call shares to each of the first and second network sites;

(B2) based on the assigned call shares, calculates call usage at each of the first and second network sites;

(B3) based on the call usages calculated in function (B2), calculates usage of each of the called and calling endpoints in the first and second groupings of components; and (B4) calculates inbound, outbound, and turnaround call usage at each of the first and second network sites.

18. The system of claim 11, wherein the determining operation (b) is repeated for each possible traffic pathway between each possible pair of communication endpoints in the first and second groupings of components and further comprising:

a configurator operable to use the determined requirement to determine a bill of material for the third grouping of components.

19. A method for analyzing at least a portion of a telecommunications network, comprising:

(a) a processor assigning a plurality of network components to at least first, second, and third groupings of components, wherein the first and second groupings of components correspond to voice communication endpoints, wherein the members of the first grouping of components handle a common first type of voice traffic and the members of the second grouping of components handle a common second type of voice traffic, and wherein the first and second types of voice traffic are different;

(b) the processor determining bulk voice traffic flows at least one of generated and received by the first and second groupings of components and passing through the third grouping of components, wherein, in the determining operation, a community of interest matrix is generated, a first axis of the community of interest matrix being associated with called endpoints in the first and second groupings of components and a second axis being associated with calling endpoints in the first and second groupings of components, and wherein the first and second groupings of components are based on the type of traffic the endpoints generate and/or receive, and wherein step (b) comprises the sub-steps:

(B1) the processor flowing bulk traffic flows through a logical characterization of the network; and (B2) the processor aggregating bulk traffic flow for the first, second, and third groupings of components, thereby populating the community of interest; and (c) the processor determining, based on the bulk voice traffic flow passing through the third grouping of components, a requirement for the third grouping of components to realize a selected grade and/or quality of service.

20. The method of claim 19, wherein the first grouping of components comprises at least one of packet-switched and circuit-switched communication devices, the second grouping of components comprises the other of the at least one of packet-switched and circuit-switched communication devices, wherein the bulk traffic flows refer to the total traffic flow between the first and second groupings of components, wherein all of the communication endpoints in the first grouping of components handle the first type of traffic and all of the communication endpoints in the second grouping of components handle the second type of traffic, and the network components in the third grouping of components comprise at least one of switches, routers, digital signal processors, gateway resources, time division multiplexed slots, time division multiplex buses, trunks, ports, codecs, and port networks.

21. The method of claim 19, further comprising:

(d) creating a logical characterization of the at least a portion of the telecommunications network, wherein the logical characterization defines the relationships among the first, second, and third groupings of components and wherein step (b) comprises the sub-steps:

(B1) determining a first fraction of first voice traffic generated by the first grouping of components that terminates on the second grouping of components;

(B2) determining a second fraction of second voice traffic generated by the second grouping of components that terminates on the first grouping of components;

(B3) based on the first and second fractions, propagating simulated voice traffic through the third grouping of components and between the first and second groupings of components;

(B4) during simulation, recording a voice traffic volume passing through the third grouping of components; and wherein the bulk voice traffic flow passing through the third grouping of components is the total recorded traffic volume passing through the third grouping of components.

22. The method of claim 21, wherein the logical characterization is a wire model in a markup language, wherein each of the members of the first grouping of components are a common first type of communication device, wherein each of the members of the second grouping of components are a common second type of communication device, the first and second types of communication devices being different, and wherein the bulk traffic flows are associated with a busy hour.

23. The method of claim 19, wherein the requirement is quantity and/or capacity, wherein the first, second, and third groupings of components are part of a first community of interest matrix and further comprising:

(d) formulating a second community of interest matrix, after and based on the requirement determined by the determining means (c), that is different and has more rows and/or columns than the first community of interest matrix, the second community of interest matrix having fourth, fifth, sixth, and seventh groupings of components of communication endpoints; and (e) determining second bulk traffic flows generated and/or received by the fourth, fifth, sixth, and seventh groupings of components to verify the determined requirement.

24. The method of claim 19, wherein the network comprises multiple geographically distributed and dislocated sites, wherein the first grouping of components is associated with a first network site and the second grouping of components is associated with a second network site, wherein step (b) comprises the sub-steps:

(B1) assigning default call shares to each of the first and second network sites;

(B2) based on the assigned call shares, calculating call usage at each of the first and second network sites;

(B3) based on the call usages calculated in function (B2), calculating usage of each of the called and calling endpoints in the first and second groupings of components; and (B4) calculating inbound, outbound, and turnaround call usage at each of the first and second network sites and further comprising:

(d) converting encrypted bulk traffic flows to corresponding unencrypted bulk traffic flows using at least one conversion factor.

25. The method of claim 19, wherein the requirement for the third grouping of components is the required quantity of the components to realize a selected grade and/or quality of service and wherein the required quantity N of the components is determined based on the following equation:

$$N \geq \left\lceil \frac{(u_t + u_r) + \sqrt{(u_t + u_r)^2 - (4)(u_r)(u_{GOS})}}{(2)(u_{GOS})} \right\rceil$$

where $U_t$ is the total bulk traffic flow through the third grouping of components, $U_r$ is the amount of the total bulk traffic flow that remains within the third grouping of components; and $U_{GOS}$ is the maximum total bulk traffic flow that may be handled by the third grouping of components to realize the desired grade and/or quality of service.

26. A computer readable medium comprising processor executable instructions that, when executed, perform the steps of claim 19.

* * * * *